United States Patent [19]
Baker et al.

[11] Patent Number: 5,363,475
[45] Date of Patent: Nov. 8, 1994

[54] IMAGE GENERATOR FOR GENERATING PERSPECTIVE VIEWS FROM DATA DEFINING A MODEL HAVING OPAQUE AND TRANSLUCENT FEATURES

[75] Inventors: Stephen J. Baker, Surrey; Dennis A. Cowdrey, West Sussex; Graham J. Olive, West Sussex; Karl J. Wood, West Sussex, all of United Kingdom

[73] Assignee: Rediffusion Simulation Limited, Sussex, United Kingdom

[21] Appl. No.: 689,924

[22] PCT Filed: Dec. 5, 1989

[86] PCT No.: PCT/GB89/01451
 § 371 Date: May 28, 1991
 § 102(e) Date: May 28, 1991

[87] PCT Pub. No.: WO90/06561
 PCT Pub. Date: Jun. 14, 1990

[30] Foreign Application Priority Data

Dec. 5, 1988 [GB] United Kingdom ............... 88 28342

[51] Int. Cl.$^5$ ............................................. G06F 15/72
[52] U.S. Cl. ................................... 395/122; 395/131; 395/164
[58] Field of Search ................ 395/122, 126, 131, 164

[56] References Cited

U.S. PATENT DOCUMENTS 4,873,515 10/1989 Dickson et al. ............... 395/163 X
4,949,280 8/1990 Littlefield ............................ 395/163
5,010,515 4/1991 Torborg, Jr. ....................... 395/163

FOREIGN PATENT DOCUMENTS 0152741 8/1985 European Pat. Off. .

Primary Examiner—Mark K. Zimmerman
Attorney, Agent, or Firm—Nixon & Vanderhye

[57] ABSTRACT

An apparatus for generating an image from data defining a model including a plurality of opaque and translucent features. The image is intended to represent a view of the model from a predetermined eyepoint and is made up from an array of screen space pixels. The image area is divided into an array of sub-areas each of which covers at least one pixel. For each feature in the model that is potentially visible from the eyepoint, a test is conducted to determine which of the sub-areas is at least partially covered by that feature. For each feature which covers a sampling point, a function of the distance from the eyepoint to that feature at the sampling point is determined. An output for each pixel within a sub-area is produced, the pixel output corresponding to the combined effects of the sampling point outputs for all sampling points which contribute to that pixel, and the pixel outputs are displayed.

67 Claims, 20 Drawing Sheets

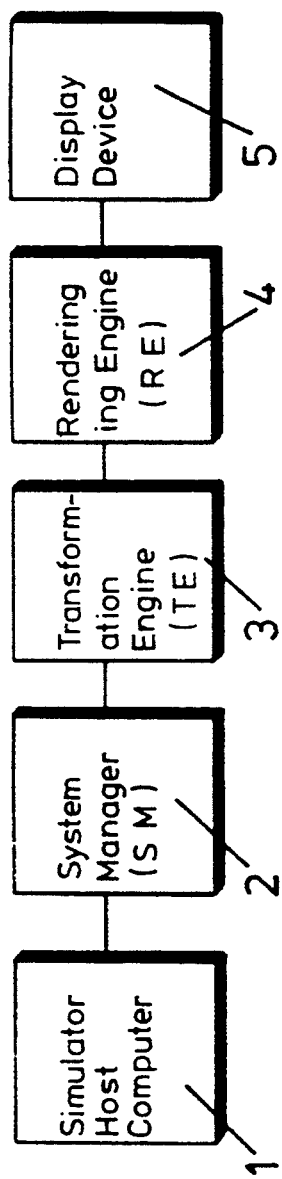
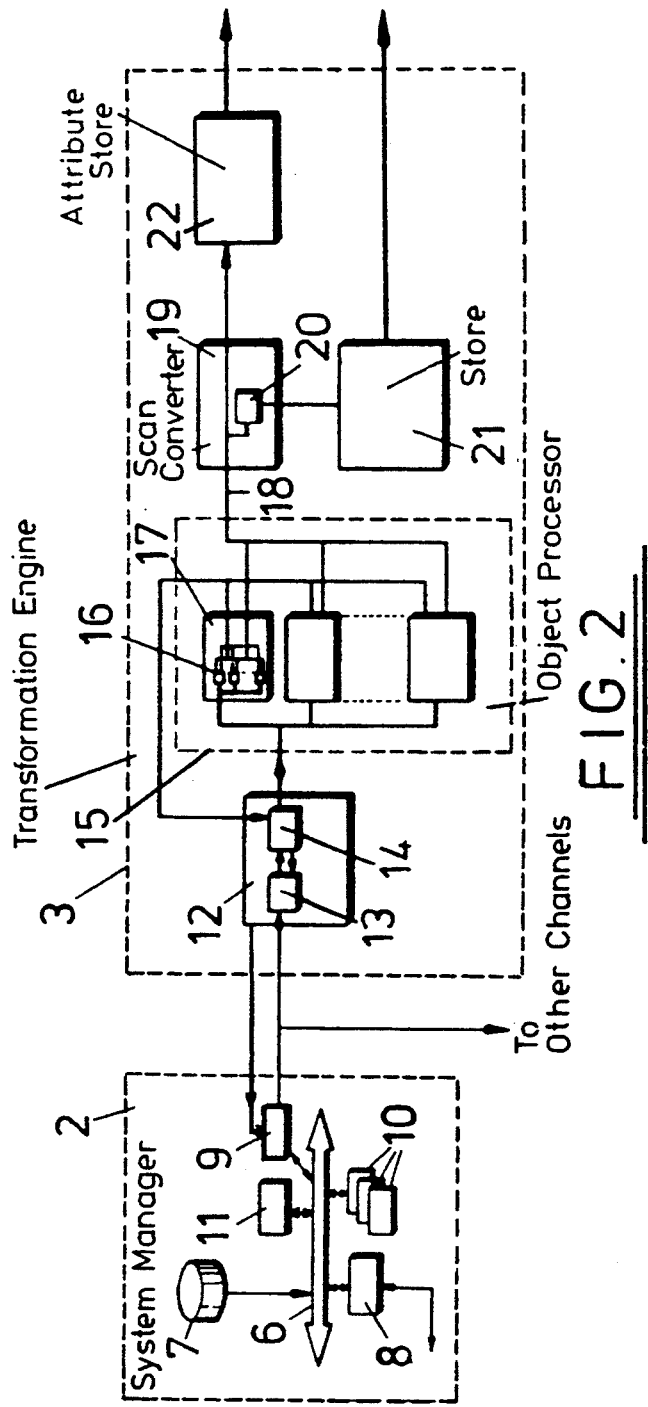

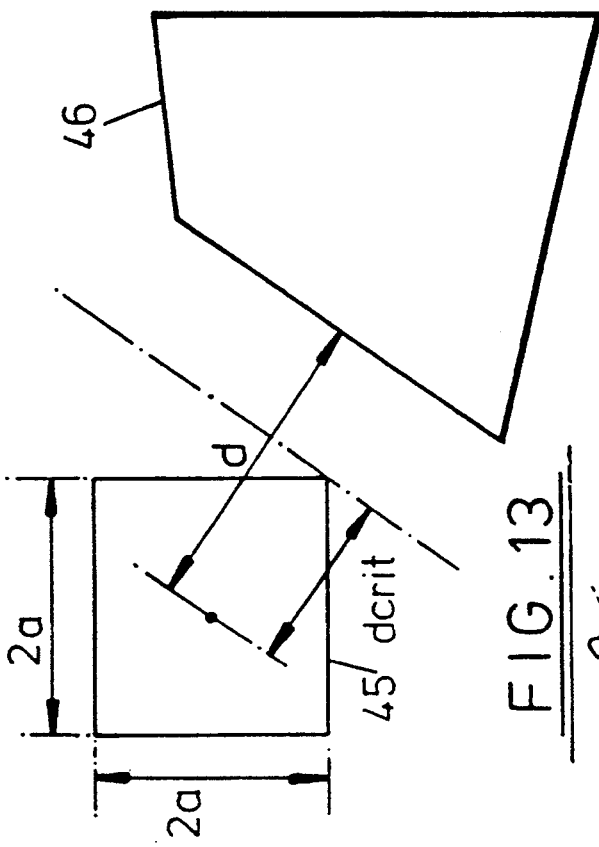
FIG. 13
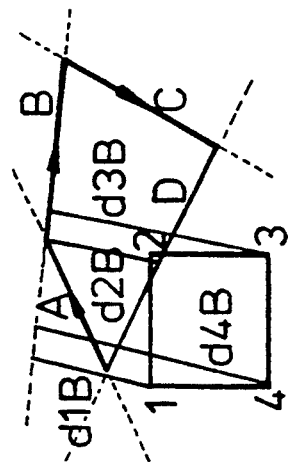
FIG. 16
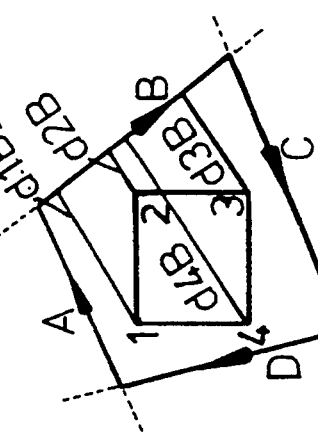
FIG. 15
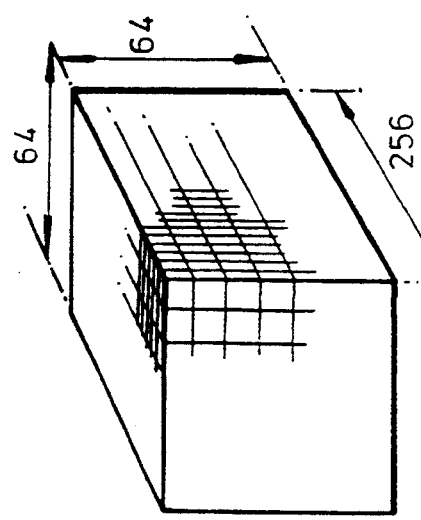
FIG. 11
FIG. 12

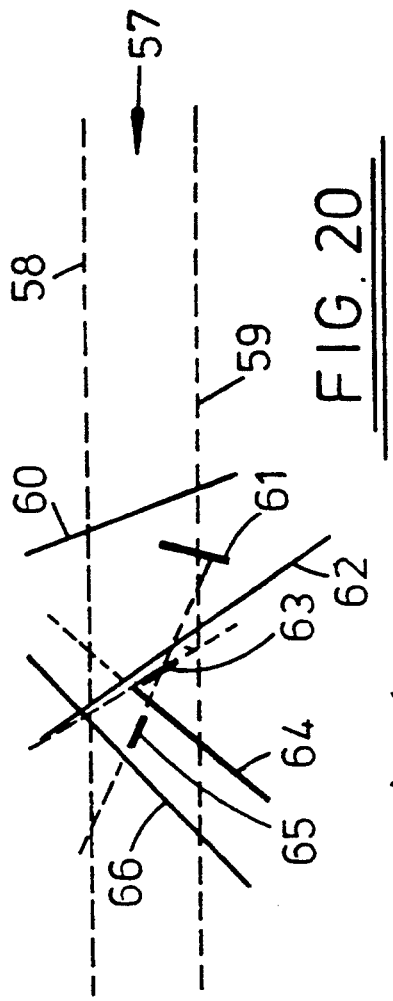
FIG. 20
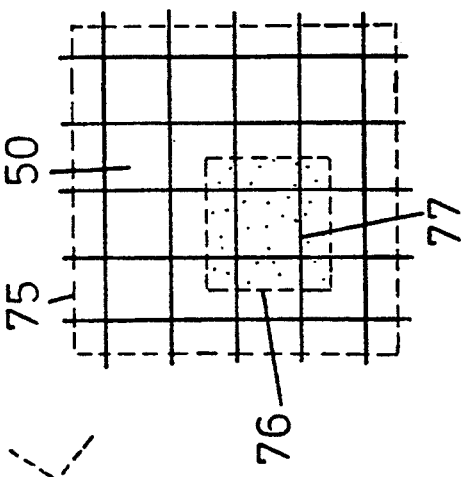
FIG. 23
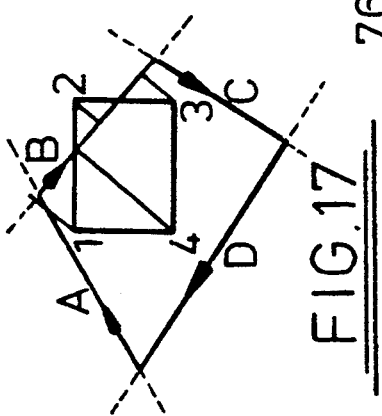
FIG. 17
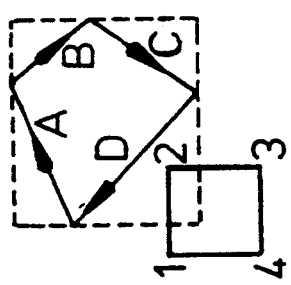
FIG. 18
FIG. 22

IMAGE GENERATOR FOR GENERATING PERSPECTIVE VIEWS FROM DATA DEFINING A MODEL HAVING OPAQUE AND TRANSLUCENT FEATURES

The present invention relates to an image generator, and in particular to a computer image generator suitable for generating information in real time from which an image can be derived for display in for example a flight simulator.

Real time image generators for flight simulators are used to generate images which are presented to pilots who are positioned in a mock aircraft cockpit. In early systems, a visual environment was created using film or video images obtained from a servodriven camera that was maneuvered above a model of the terrain over which movement was to be simulated. These approaches were widely used but were found to be incapable of producing realistic scenes with true perspective from a wide range of eyepoints. In order to overcome these limitations, image generators producing computer generated imagery were introduced, the first commercially successful systems appearing in the early 1970s. Such systems are now used almost exclusively in flight simulator application, and are usually referred to as CIG (Computer Image Generation) systems.

In a CIG system, the intended viewer of the image produced by the system, i.e. the simulator pilot, looks out through an imaginary window into a three dimensional (3-D) world defined by information stored as geometrical and other characteristic attribute data. A line drawn from the eyepoint through the window intersects a point in the 3-D world. The color and intensity of that point must be "painted" on the window at the point of intersection of that line with the window. The displayed image is made up from a series of picture elements (pixels) each of which is of uniform color and intensity, the color and intensity of each pixel being a function of the position of the eyepoint relative to the 3-D world which the stored data represents. In a real time display where hundreds of thousands of pixels must be updated sufficiently quickly to avoid jumping of the image, it is necessary to perform many millions of calculations per second to maintain image fidelity. In most simulator systems producing a wide angle display the image is made up from three juxtaposed images each derived from a common database but generated by a respective processing channel. The computational load is thus shared between the three channels. We are concerned herein with the processes within a single channel only and therefore the interrelationship between associated channels will not be discussed.

A review of the problems confronted in real time CIG systems and various approaches to solving these problems is given in the publication "Computer Image Generation", edited by Bruce J. Schachter, published by John Wiley & Sons Inc. 1983, ISBN 0-471-87287-3. Brief details of common approaches adopted in known CIG systems are however given below to provide a context for the techniques described herein.

Generally, a simulator is designed to simulate the passage of an aircraft over a defined area of known terrain, for example the approaches to particular airports. In one known system, a main database is produced which is a 3-D model of that terrain, each point within the terrain having world space coordinates defining the position of that point relative to a predetermined origin. The entire 3-D surface is defined in terms of a series of features, e.g. polygons, having defined vertices, a defined color and a defined surface normal (a line drawn perpendicular to the plane of the polygon from one vertex). Further characteristics may be specified, e.g. surface texture (water, grass, etc.), the geometrical and other characteristics being referred to as the attributes of the feature.

The main database (referred to herein as the available database) may contain an area of the earth's surface far larger than that which can be seen from any one eyepoint position, for example an area 200 nautical miles square. The normal visibility range is generally considered to be less than 40 nautical miles. Thus not all the data within the main database has to be immediately available, and therefore data relating to an area within a circle of predetermined radius (e.g. 40 nautical miles) centered on the eyepoint is downloaded into an active or on-line database.

The position of the eyepoint relative to the available database changes over time in response to the manipulation of the flight controls of the simulated aircraft. These changes are calculated in known ways and are not directly relevant to the techniques described herein. Suffice it to say that at any point in time the simulator produces an output indicating the eyepoint position in world space coordinates and indicating the viewing direction, that is a vector drawn from the pilot's eye point to the center of the viewing window.

The content of the active database is used to derive the color and intensity information of each picture element (pixel) of the image to be displayed on a screen placed in front of the simulator pilot. Each pixel is on a unique predetermined imaginary viewing line extending from the eyepoint to the screen and notionally extending through the screen onto the surface of the model defined by the data in the active database. This means that the world space coordinate system of the database must be transformed using the eyepoint coordinates into a screen space coordinate system. This enables the surface area of the model which determines the color and intensity of each pixel (for which the screen space coordinates are known) to be determined. Once that surface area has been determined, the color, intensity and other attributes of every feature contributing to that pixel can be obtained and appropriate calculations performed to determine the uniform color and intensity of the pixel.

If the modelled surface is planar, each feature defines a surface within that plane and therefore no feature is normally occulted by another. If acceptable realism is to be achieved however, it must be possible to display images including 3-D objects such as buildings. This inevitably means that, depending on the eyepoint, some features will be obscured by buildings and should not therefore contribute to the color and intensity of pixels onto which that building is projected. This can be handled if different features are allocated different priorities, e.g. priority one corresponds to the surface of the ground, priority two corresponds to buildings, and priority two features are always considered to be in front of priority one features which lie on the same viewing line.

Therefore, it is an essential requirement of conventional real time CIG systems that the correct relative occultation priority be assigned to features contained within the available database. Obviously this predetermined hierarchy of priorities will only be valid for a given range of eyepoints. For example if the pilot observes a building from one side, the wall of the building on the observed side will obscure the wall on the other side. If however the pilot's position changes to the other side of the building, the opposite is true. Therefore it can be seen that feature priorities must be continually changing as the pilot moves around the database if image realism is to be maintained.

When constructing a database for use by a conventional CIG system, predetermined priorities will be assigned to features, plus additional information required to modify this predetermined priority to produce the instantaneous priority hierarchy for any given eyepoint position and orientation. Therefore, database preparation is both complex and time consuming, especially as database complexity is increased to achieve greater realism.

The instantaneous feature hierarchy is calculated by an on-line sorter. As database complexity increases, this sorter ultimately restricts system throughput as it incorporates classical sort algorithms which cannot be addressed by parallel processing techniques. In addition, it is not possible using this approach to resolve complex dynamic object interactions. Therefore it is quite common to observe visual artifacts on the screens of conventional real time CIG systems, e.g. vehicles being visible through buildings behind which they are positioned.

In order to overcome the inherent disadvantages of the conventional predetermined feature priority approach described above, it has been proposed to implement an alternative technique known as Z-buffering, thereby enabling the correct implementation of complex CIG scenes. To implement the Z-buffered techniques, no predetermined priority is required. The CIG system resolves feature priority at the pixel level by calculating the Z-depth (the distance of a given feature from the eyepoint in the 3-D scene measured in the direction perpendicular to the viewing plane.) for each feature which impacts a given pixel. As the color and intensity of each feature is processed, this, together with its Z-depth, is loaded into a frame store. As subsequent features are processed which impact the same pixel the Z-depth of each new feature is compared with that of the original held in the frame store. If the new feature is closer to the observer than the original, and therefore occults the latter, the original feature is disregarded and replaced by the new one. This process is repeated until all the features in the scene have been processed, whereupon the last entry in the frame store for each pixel is the color and intensity data for the nearest feature visible to the observer.

The main advantage of the Z-buffered technique over the conventional approach is the elimination of the feature priority sort task, thus enabling scenes of greater complexity to be generated. In addition, database construction is considerably simplified as no priority information need be added to feature descriptions. Finally, complex dynamic object interactions can be simulated due to the fact that feature occultation is resolved to pixel (or even sub-pixel) resolution.

Despite the obvious advantages of using the Z-buffered technique, its implementation gives rise to a number of new problems. Firstly, as features are processed in random depth order, it is necessary to compute all feature parameters, e.g. texture, smooth shading, fog, etc., even though the majority will be discarded at the frame store where the Z-depth compare takes place. This imposes a huge computational load which makes Z-buffering very difficult to achieve in real time systems. In a known Z-buffered system a sorter routes features through the system in top-down order, i.e. nearest feature first. This means therefore that once a pixel area is fully covered the system can eliminate more distant features from further processing and move onto the next pixel. Unfortunately such a sorter itself represents a bottleneck limiting system throughput as all the features must be sorted before processing of pixels can begin. Secondly, in order to achieve satisfactory scene quality without visible aliasing, it is necessary to compute the Z-depth for each feature at sub-pixel level. Thus a system capable of producing a final scene resolution of one million pixels, with eight sampling points or sub-pixels per pixel, must compute and compare Z-depths for eight million sampling points. This imposes a huge computational load. Thirdly, one of the main disadvantages of conventional Z-buffered systems is an inability to represent transparent features in the scene. This is because the representation of transparency in the CIG scene is created by overlaying a transparent surface over an opaque surface. Therefore, for a given pixel, two features, one transparent and the other opaque, with dissimilar Z-depths, may be contending for the same location in the frame store. This can result in a more distant opaque feature being discarded in favour of a nearer translucent feature, thus creating a visual artifact.

Whilst the Z-buffer technique is well understood and used extensively for non-real time CIG systems, to date it has not been used to fully implement all the algorithms and techniques required for a high performance real time CIG system. Some real time Z-buffered CIG systems have been developed, but they have not overcome the inherent disadvantages discussed above, and are therefore lacking in image quality and realism.

There are many published documents describing various Z-buffer techniques and implementations. By way of example, the article "Frame buffer display architectures" by Robert F. Sproull, Ann. Rev. Comput. Sci. 1986, 1:19–46 (0272-1716/86/1100-0031) which describes various Z-buffer implementations, the article "Hardware assistance for Z-buffer visible surface algorithms" by Kellogg S. Booth et al (IEEE publication 0272-1716/86/1100-0031) which refers to difficulties encountered in achieving anti-aliasing in Z-buffer implementations, the article "On the power of the frame buffer" by Alain Fournier et al, ACM Transactions on Graphics (0730-0301/88/0400-0103) which describes depth buffer mathematics and feature impact assessment by reference to line equations, the article "Computing Digital Images" by Thomas Porter et al, Computer Graphics Vol. 18, No. 3 (0-89791-1385/84/007/0253) which describes the provision of an A-channel to store the extent of coverage at a pixel, the article "A characterization of ten hidden surface algorithms" by Ivan E. Sutherland et al, Computing Surveys, Vol. 6, No. 1, March 1974, pp. 387–441, and the article "A review of recent hidden surface removal techniques" by P. J. Willis, Displays, January 1985 pp. 11–20. None of the articles describe techniques realistically capable of solving the above problems in real time without the use of specially prepared models.

It is an object of the present invention to obviate or mitigate the problems outlined above.

A further problem encountered with CIG systems is that of image distortion. Image projection devices, particularly large-scale devices of the type used in flight simulators, introduce distortion. Thus individual pixels of a display although nominally rectangular appear distorted when projected, and nominally straight rows of pixels appear curved when projected. Various techniques have been proposed for dealing with these problems, for example that described in U.S. Pat. No. 4,714,428. This document describes a system in which features are arranged in a descending order of priority and the impact of features on sub-areas or spans of the screen space is analyzed by reference to line equations defining the position of feature edges in screen space. The corners of the spans are mapped into distorted image space and as a result image system distortions are taken into account in preparing image data for display. Unfortunately as the spans are distorted, it is necessary to recompute feature edges in each span. This maintains the continuity of each edge across the boundary between any two spans, but each edge as displayed is made up from a series of mutually inclined straight edges rather than a continuously curved line. Furthermore the need to recompute feature edges at each span boundary is computationally intensive.

It is a further object of the present invention to obviate or mitigate the distortion problems outlined above.

A further problem encountered with conventional CIG systems is the accurate simulation of light points. High intensity light points effectively occult any surfaces in front of which they are positioned. The appearance of low intensity light points however is affected by for example the color of surfaces in front of which they are placed. In conventional real time systems light points are simulated by opaque features generally occupying a rectangular area in screen space. If the intensity of a light point is reduced, e.g. reduced to zero to simulate light failure, the result appears to be a "hole" cut in the image where the light point is positioned.

It is a further object of the present invention to obviate or mitigate the problems of low intensity light point simulation outlined above.

Further problems of light point simulation are "build-up" and "popping". Build-up arises when the intensity of light points which overlap in screen space are summed to result in an unnaturally high intensity. Popping occurs when a light point defined as a point of zero area in world space suddenly "appears" from behind a feature. These problems cannot be addressed in conventional systems given the modelling of light points as residing at true geometrical points in world space.

It is a further object of the present invention to obviate or mitigate the "build-up" and "popping" problems outlined above.

A further problem encountered in known real time CIG systems is load balancing. It is known to provide an array of parallel processors each of which processes a respective portion of the feature data required to complete the final image- The features are usually split into small pieces of regular size and shape (e.g. "spans" or "cells"), and each processor is allocated a particular set of cells, e.g. one processor works on even numbered rows of cells, and a second processor works on odd numbered rows of cells. Unfortunately, the amount of detail in a three-dimensional world space scene is not evenly distributed across screen space. In particular, the effects of perspective tend to increase the feature density towards the horizon. Thus if each processor is allocated a particular area of the screen one processor can be heavily overloaded whilst another is underloaded. The system is then forced to slow down to the speed of the slowest processor.

It is a further object of the present invention to obviate or mitigate the problem of load imbalance between parallel processors outlined above.

A further problem encountered in conventional real time CIG systems is that of efficient scan conversion. Scan conversion is the process of rasterization of polygonal data into a frame store and is fundamental to graphics workstations and computer image generators. A general overview of scan conversion algorithms may be found in "Fundamentals of Interactive Computer Graphics" by Foley & Van Dam, published by Addison Wesley. A more specific example of a known scan conversion technique is described in the article "A parallel algorithm for polygon rasterization" by Juan Pineda, Computer Graphics, Volume 22, No. 4, August 1988 (0-89791-2756/88/008/0017). The known techniques described by Pineda rely on edge functions that define the edges in screen space of a feature and an algorithm which enables the position of a pixel relative to the edge function to be determined, a position being indicated as either to the left or the right of the edge function. A feature is traversed in a logical manner to determine its extent, the traversal being controlled in response to detection of a change from one side to the other of an edge function. It is not possible however to efficiently assess whether or not screen space areas are impacted by a particular feature if those areas are relatively large.

It is thus a further object of the present invention to obviate or mitigate the scan conversion problems outlined above.

A further problem encountered in real time image generators is that of efficiently reading out and transforming data from the active database. Most real time 3D graphics systems contain parallel processors which transform input data from three (world space) dimensions to two (screen space) dimensions. This transformation involves at least translation, rotation and perspective calculations, and may include other mathematics. The sub-system responsible for this work is split into parallel processors in order to increase data throughput. Unfortunately the known systems are still not very efficient. In one known system, each processor performs a different task, so that one processor performs translations, a second rotations, and a third perspective calculations. This is a very inflexible arrangement in that only three processors can be used, and the processor responsible for translations will be very underloaded as translation is a relatively simple operation compared to rotation for example. In another known system, the active database can be divided equally between the available processors. This approach also has little merit as in practice most of the available database lies outside the field of view and this tends to result in some processors being very underloaded because all or some of their part of the database is outside the field of view. Thus it is a further object of the present invention to obviate or mitigate the problems outlined above associated with transforming data read out from the database. According to the present invention, there is provided an apparatus for generating an image to be displayed on a display screen from data defining a model including a plurality of opaque and translucent features, the image being intended to represent a view of the model from a predetermined eyepoint and being made up from an array of screen space pixels to be displayed by a raster scanning process, each pixel being of uniform color and intensity, and the pixels together defining an image area, comprising:

a. means for dividing the image area into an array of sub-areas each of which covers at least one pixel,
b. means for determining for each feature in the model that is potentially visible from the eyepoint which of the sub-areas is at least partially covered by that feature,
c. means for producing a list of feature identifiers in respect of each sub-area, the list for any one sub-area identifying features which at least partially cover that sub-area,
d. means for determining the position in screen space of at least one sampling point within each sub-area,
e. means for determining, for each sub-area in turn, and for each said sampling point, which of the features in that sub-area's list cover that sampling point,
f. means for determining, for each feature which covers a sampling point, a function of the distance from the eyepoint to that feature at the sampling point,
g. means for storing feature describing data for each sampling point within a sub-area, the stored data being indicative of at least the distance of the opaque feature which covers the sampling point and is nearest to the eyepoint and the distance and translucency of at least one nearer translucent feature Which covers the sampling point,
h. means for producing an output for each sampling point within a sub-area, the sampling point output corresponding to the combined effects of the features identified by the data stored in the data storing means,
i. means for producing an output for each pixel within a sub-area, the pixel output corresponding to the combined effects of the sampling point outputs for all sampling points which contribute to that pixel, and
j. means for displaying the pixel outputs.

Each sub-area may cover a plurality of pixels, and more than one sampling point may be positioned within each sub-area.

Preferably, an array of parallel sampling point processors is provided each including a said sampling point cover determining means, a said distance determining means, a said storing means and a said sampling point output producing means. One sampling point processor may be provided for each sampling point within a sub-area.

Preferably an array of parallel pixel processors is provided each including a said pixel producing output means, one pixel processor being provided for each pixel within a sub-area. Preferably more than one sampling point is provided per pixel, and preferably the pixel output producing means receives inputs in respect of each pixel from the or each sampling point lying within the pixel and the or each sampling point lying within a predetermined area extending around the pixel.

The invention also provides an image generator for use with an image projection system in which an image is projected onto a display surface and the display surface is viewed from a predetermined eyepoint through an imaginary viewing plane of predetermined area, the image being projected as a series of raster scan lines each made up from a respective row of display pixels, wherein the image generator comprises a model database in which features of the model are described by geometrical attribute data defining the feature with reference to world space and non-geometrical attribute data defining characteristics of the feature, means for determining an eyepoint position in world space from which the model is to be viewed, means for transforming geometrical attribute data from world space to eyepoint space, and means for calculating image data to be displayed on the display surface from the transformed geometrical attribute data and the non-geometrical attribute data, the image data being consistent with the appearance of the model from the eyepoint, wherein the image data calculating means comprises:

a. means for dividing the viewing plane area into an array of sub-areas, each sub-area being defined by four corner coordinates arranged such that a projection of the sub-area onto the display surface from the eyepoint corresponds in shape and area to a portion of the display surface upon which a predetermined respective group of pixels is projected,
b. means for defining the position of at least one sampling point within each sub-area, each sampling point position being defined by reference to the corners of the respective sub-area,
c. means for determining from the transformed geometrical feature attributes and the position of each sampling point which of the sampling points is covered by each of the features,
d. means in respect of each sampling point for storing non-geometrical attribute data for at least one feature covering that sampling point, and
e. means for generating from the stored attribute data an output to the image projection system in respect of each pixel.

Each sub-area may have linear edges, and each sub-area may correspond in area to a rectangular array of pixels including a plurality of rows and columns of pixels.

The invention further provides an apparatus for producing an image on a display screen of a world space model made up from a plurality of features defined in world space, the model including light point and non-light point features and being viewed from an eyepoint defined in world space, wherein the apparatus comprises:

a. means for calculating a finite area in screen space to be occupied by each light point feature,
b. means for calculating the intensity of light point features,
c. means for calculating a translucency for each light point feature visible from the eyepoint, the calculated translucency being a function of the calculated intensity, and
d. means for producing outputs to a display device appropriate to a final calculated intensity of the light point feature.

The invention also provides an apparatus for producing an image on a display screen of a world space model made up from a plurality of features defined by world space coordinates and viewed from an eyepoint defined in world space, the model including light point features each defined by world space coordinates determining the position of the light point in world space, wherein the apparatus comprises:

a. means for calculating the screen space coordinates of each light point,
b. means for calculating a screen space area for each light point as a function of at least the distance in world space from the light point to the eyepoint,
c. means for calculating an intensity for each light point,
d. means for defining the screen space positions of a plurality of sampling points distributed across the display screen, e. means for determining for each light point which of the sampling points lie within the calculated area of the light point, and f. means for producing an output to a display device for each light point appropriate to the calculated light point intensity and the particular sampling points which lie within the calculated area of the light point.

The intensity may be calculated as a function of at least the distance from the eyepoint to the light point. Where at least one of the light point features is to be displayed calligraphically, the apparatus preferably further comprises means at each sampling point for calculating the attenuation of a calligraphic light point within the area of which that sampling point is located, the attenuation being calculated to take account of the presence of any other feature which covers the sampling point and is nearer to the eyepoint than the calligraphic light point, and means for calculating a display intensity for the calligraphic light point which is a function of the sum of the attenuations the calligraphic light point at all the sampling points which are positioned within the area of the calligraphic light point and the light point intrinsic intensity.

The invention further provides an apparatus for distributing the computational load on a sub-system of an image generator between a plurality of processors, the image generator being intended to produce image data for display on a screen, comprising:

a. means for dividing the screen into sub-areas, each sub-area covering at least one display pixel, and each processor being adapted to process data related to one sub-area at a time, and b. means for distributing processing tasks to the processors such that data related to immediately adjacent sub-areas is processed by different processors.

Preferably means are provided for reading out data describing each of a series of features potentially contributing to the image to be displayed, the data describing each feature being read out to each of the processors in parallel, and each processor comprises means for selecting screen space coordinates of the sub-area to be processed by that processor, means for analyzing feature data read out to the processor to determine whether or not that feature contributes to the selected sub-area, and means for outputting data identifying features contributing to the selected sub-area.

The invention further provides an apparatus for scan converting data describing a plurality of features to enable the display of an image of a world space model defined by those features, each feature having a boundary defined by a plurality of straight edges, and each edge being defined by a line equation in screen space coordinates, the apparatus comprising means for dividing the screen into a plurality of sub-areas, and means for analyzing the coverage of any one sub-area by any one feature, wherein the coverage analyzing means comprises:

a. means for calculating the perpendicular distance from a reference point within the said one sub-area to each edge of the said one feature, b. means for calculating a limiting distance from the reference point, the limiting distance being such that if a feature edge is at a perpendicular distance from the reference point which is greater than the limiting distance that edge cannot cross the sub-area, c. means for comparing the calculated perpendicular distances with the limiting distance, and d. means for assessing coverage of the sub-area by a feature on the basis of a logical combination of the results of the comparisons between the calculated distances and the limiting distance.

Preferably each sub-area is rectangular and means are provided to calculate a limiting distance for each edge of a feature with respect to each corner of the sub-area, the limiting distance being the perpendicular distance from the center of the sub-area to a line drawn parallel to a respective feature edge and passing through the respective sub-area corner.

The invention also provides an apparatus for processing data describing a model an image of which is to be displayed on a screen, the model comprising a plurality of features each described in terms of geometrical attributes defining the position and orientation of the feature and non-geometrical attributes defining characteristics of the feature, and the image being intended to represent a view of the model from an eyepoint in world space, comprising a. a database in which model data is stored in a hierarchical tree structure having a root node corresponding to the base of the tree, branch nodes corresponding to branching points of the tree, and leaf nodes corresponding to the ends of individual branches of the tree, each node of the tree storing data describing a respective object, leaf nodes storing at least one feature which contributes to the respective object, and root and branch nodes storing at least one pointer to another object and transformation data defining the relative position and orientation of the pointed to object relative to the pointed from object, whereby successive locations in the tree structure store data related to successively more detailed portions of the model, b. a transformation processor having a parallel array of object processors, and c. a controller for reading out data from the database to the object processors such that data read out from one node is read out to one data processor, wherein each data processor is adapted to receive data read out from any node of the tree, the object processor responding to read out of pointer data by transforming the respective transformation data into a common coordinate space and returning the pointer and the transformed data to the controller, and the object processor responding to read out of a feature by transforming the geometrical attributes of the feature and outputting the transformed attributes for further processing, the controller being adapted to read out data stored at the node corresponding to the base of the tree and subsequently to read out data stored at nodes of the tree identified by the pointers returned to it from the object processors.

The controller may be arranged to read out object data to a bus to which each object processor is linked, means being provided to indicate whether or not an object processor is idle and available to receive object data for processing, and means are provided for enabling one idle object processor to receive object data made available on the bus, the object processor receiving the object data indicating that the object data has been received for processing to prevent the same object data being received by other object processors. Further features of the invention will be apparent from the description and subsidiary claims forming part of this specification.

An embodiment of the present invention will now be described, by way of example, with reference to the accompanying drawings, in which:

FIG. 1 is a schematic illustration of the basic configuration of a CIG system in accordance with the present invention;

FIG. 2 is a schematic illustration of a system manager and transformation engine suitable for use in a system of the type illustrated generally in FIG. 1;

FIG. 11 illustrates the functional structure of the store of FIG. 10;

FIG. 12 illustrates the relative disposition of the boundaries of sub-areas of screen space relative to a bounding box for a feature;

FIG. 13 illustrates the processing of edge equations in the scan converter;

FIGS. 15 to 18 illustrate the processing of edge equations in a presorter which is a component part of the rendering engine;

FIG. 20 illustrates the operation of the presorter in determining which features are occulted;

FIG. 22 illustrates the distribution of processing tasks in the pre-sorter;

FIG. 23 illustrates the distribution of sampling points relative to a single pixel of the final display;

Figure 3:
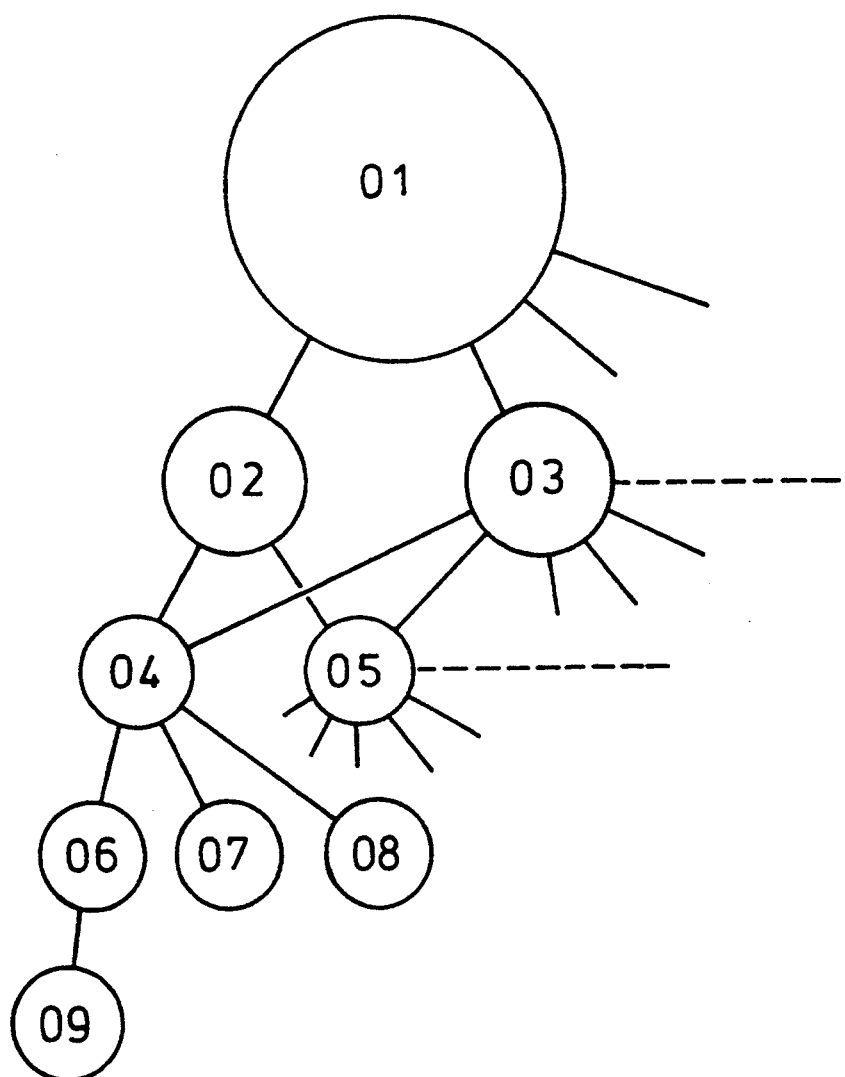
FIG. 3 is a simplified illustration of a database tree structure.

Referring to FIG. 1, this illustrates the basic functional components of an embodiment of the present invention adapted for use in a flight simulator. The simulator incorporates a host computer 1 which provides outputs corresponding to the position and attitude of the simulated aircraft relative to a world space model of the earth's surface. An image is to be displayed which is representative of the appearance of the modelled surface to an observer in the simulated aircraft. In the described embodiment, the image is projected onto a back projection screen. The observer views a reflection of the back projection screen in a large spheroidal mirror. It will be appreciated however that alternative display systems may be used. A system manager (SM) 2 receives the outputs of the host computer 1 describing the aircraft's position and attitude and downloads from a database model-describing data corresponding to those portions of the model which are potentially visible from the observer's eyepoint given the position and attitude of the simulated aircraft. The image is projected as a plurality of raster scan lines and a plurality of calligraphic light points which are superimposed on the image raster at the end of each raster scan. It will be appreciated that a functional system could be provided which did not have the capability to display calligraphic light points.

The model-describing data is predetermined during model production but will describe features of the model scene, for example runways, buildings and fields, in terms related to a set of world space coordinates with a predetermined origin. As described in greater detail below, the features include straight edged polygons, and elliptical or circular (in screen space) surfaces. Raster light points are displayed as screen space ellipses or circles as part of the normal raster scanning process, and calligraphic light points are circular in screen space. The model-describing data is hierarchically ordered such that individual features of the model are defined by reference to objects of which they form a part, and those objects are in turn defined by reference to other objects in the model.

The extracted model-describing data is passed to a transformation engine (TE) 3 which performs two main functions, that is geometric transformation of model feature data from the database or world coordinate system to the observers or eyepoint coordinate system, and perspective transformation from the 3-D eyepoint coordinate system to a 2-D screen space coordinate system. The techniques used to achieve such transformations are well known and accordingly are not elaborated in detail here.

The TE 3 provides a stream of model-describing data in screen coordinates to a rendering engine (RE) 4. The RE 4 performs a number of functions using model feature geometrical attribute data (e.g. size and position) and model feature non-geometrical attribute data (e.g. color, translucency) received from the TE 3 to produce a final color for each pixel in the image to be displayed. Data representing the non-geometrical attribute data is loaded into a frame store within the RE 4, the frame store having a storage address in respect of each pixel in the final display. The contents of the frame store are downloaded to a display device 5 which produces the final image. It should be understood that the frame store can contain a complete frame for a non-interlaced display device or a field for an interlaced display device.

It should be appreciated that the system has four main pipe-lined stages such that as one image frame is being displayed, the next frame to be displayed is being rendered in the RE 4, the next but one frame to be displayed is being processed in the TE 3, and the next but two frame to be displayed is being processed in the SM 2. Each stage is separated from the or each adjacent stage by a double buffered store. A "frame swap" signal is generated to cause all the double buffered stores to swap in unison. Thus data relevant to one frame is effectively "clocked" through the pipe-line by the frame swap signal.

FIG. 2 illustrates the SM 2 and TE 3 of FIG. 1 in more detail. The SM 2 is essentially conventional, comprising a VME data bus 6 which links the various modules which are contained within this sub-system. These include an available database store 7, host interface 8 which provides bidirectional communications with the host computer, a general purpose interface 9 which provides bidirectional communications with the TE and RE via command and status lines and is capable of broadcasting database information to the transformation engine, an array of CPUs 10 which perform all the necessary system manager computational tasks, and an active database memory 11 (ADB) which stores a subset of the available database covering an area centered at the observers instantaneous eyepoint and extending to the appropriate visual range, 360° around the observers eyepoint.

The SM 2 performs a number of conventional functions including the following:

Host Communications

The image generator is connected to the host simulator computer via an Ethernet link. This provides the capability for networking multiple simulators and/or multiple image generators together. Communication between the host simulator and the image generator is two-way. The host sends the data defining the position and orientation of all host controlled moving vehicles (of which the simulated aircraft, or host vehicle, is one), plus data defining for example airfield lighting status, weather conditions, etc. The image generator sends back to the host computer data defining height above terrain, collisions, and status of various objects (such as dynamic objects) in the scene.

Database Selection

The actual data resident at any one time in the database memory (the active database ADB) is continually updated as the eyepoint moves across the modelled world, by downloading new data from disk and discarding data that is no longer required, such that the ADB contains all database objects within visual range at any one time, together with any "library" objects, that is objects which move relative to the modelled world and thus must be available to be accessed at any eyepoint.

Timing and Load Control

The system manager controls the overall timing of the image generator and is responsible for maintaining a regular and optimal frame rate. To aid in this task, timing signals are received from the various parts of the TE and RE and used to control the instantaneous scene content (using level of detail switching as briefly described below) and to take appropriate action when the frame time extends beyond its optimal value (overload control). Statistical information is also collected concerning data throughput and processing time, and is available to the user for evaluating the performance of the system under different conditions (e.g. with different models, different TE configurations, etc.).

The database has the ability to store different versions of objects containing different levels of detail; the TE determines the correct level of detail representation of the object, in dependence upon how far it is from the eyepoint. The TE does nothing to change the level of detail if the currently displayed level of detail is wrong, it merely informs the SM that it needs to change the level of detail, whereupon the SM coordinates the fading of one level of detail to another.

Overload control attempts to reduce the frame-time by reducing the overall modelled feature content of objects. It does this by, firstly, removing unnecessary detail (such as embellishments) from distant objects, then secondly, switching the representation of objects to an artificially low level of detail if further action is still necessary to achieve a desired frame time. Overload control only comes into operation if the volume of data to be processed is so large that the task cannot be completed within a predetermined maximum acceptable frame time.

Level of detail control is a technique well known in the field of flight simulators and will not be described in detail here.

Special Effects

Data received from the host simulator computer or from a local terminal describing the environment is processed in order to send the appropriate information to the TE and RE for the generation of weather effects, landing light lobes, etc. This data includes cloud height, visibility, fog density, landing light status and beam direction, time of day (controlling ambient light levels), and precipitation centers and growth/decay rates for correlation with weather radar.

Object Interaction

The system manager is responsible for collating data which is sent back from the TE describing interactions between objects in the active database. This data is filtered and sent back to the host computer as necessary. The data is used for height above terrain computations, collision detection, range finding, etc.

Typically there will be three channels driven by the image generator, each with its own TE, RE and display device. Other configurations are possible however, e.g. a single channel system, or a system in which for example three sub-channels are driven by one image generator. Such variations in configuration are not germane to the present invention however and therefore only one channel will be described.

Referring now to the TE 3 in detail, as the SM 2 is assembling the required data in the ADB, the TE 3 is processing data previously read out from the SM 2 into a channel active database (CADB) 12. The CADB 12 comprises a memory 13 and control logic 14 which controls the readout of data from the memory to an array of object processors 15 that in turn provides control inputs to the control logic 14. The memory 13 holds the entire active database and the control logic 14 selects channel specific object data for processing. The object processor array 15 comprises individual object processors 16 arranged in groups on respective boards 17. These processors form the main computational element of the TE 3. It will be appreciated that as many object processors can be provided as are necessary to meet the required system performance.

A common output 18 of the object processor array 15 is delivered to a scan converter 19 incorporating a logic unit 20 providing an output to a scan converter store 21. An attribute store 22 receives inputs via the scan converter 19. Some of the data input to the store 22 does not require transformation in the object processors. One example of such data is texture maps. Such data is simply passed straight through the object processors and the scan converter.

Referring to FIG. 3, this schematically illustrates a simplified database "tree" structure. The tree structure represents the way in which model feature data is stored so as to enable efficient retrieval of data relevant to a particular frame. The world space model is considered as being made up from a series of "objects". Objects are linked by the tree structure such that each object resides at a respective node of the tree. The tree structure has a root node (Object 01 in FIG. 3), branching nodes (Objects 02 to 06 in FIG. 3), and leaf nodes (Objects 07 to 09 in FIG. 3). The root and each branching node will include at least one pointer to a linked node. In the simplified case illustrated in FIG. 3, the object 02 stores pointers to objects 04 to 05, and the object 04 stores pointers to objects 06 to 08. Individual features, e.g. polygons and light points, are distributed throughout the tree structure. For example, each leaf node will include at least one feature, and the base and branching nodes may each include one or more features. Thus successive objects in the tree store data relating to successively more detailed portions of the world space model. For example, in FIG. 3, object 01 could represent a particular geographical area, objects 02 and 03 respective portions of that area, objects 04 data describing for example an airfield within the area of object 02, and so on.

Each object can store as much data as can be processed by one object processor in a single cycle of that object processor. In one implementation, up to forty features (e.g. polygons, light points) can be stored in each object. The root and branch nodes will also store pointers to other objects, the total combination of features and pointers being limited to a level which prevents overloading any one object processor. The features and pointers within each object are defined with reference to "object space", that is a coordinate system which is transformed by translation and rotation from the world space coordinate system. Thus each pointer includes not only the identity of the pointed to object but also data giving the appropriate translation and rotation necessary to transform the object space of the pointed to object into the object space of the pointed from object. The root node object is directly referenced to world space, and each other object is indirectly referenced to world space through the concatenation of the translations and rotations linking it through the object tree to the root node. Thus each object may be considered as being defined with reference to a common coordinate space, that is world space, although within each object features and pointers are defined with reference to the object space of that object.

Figure 4:
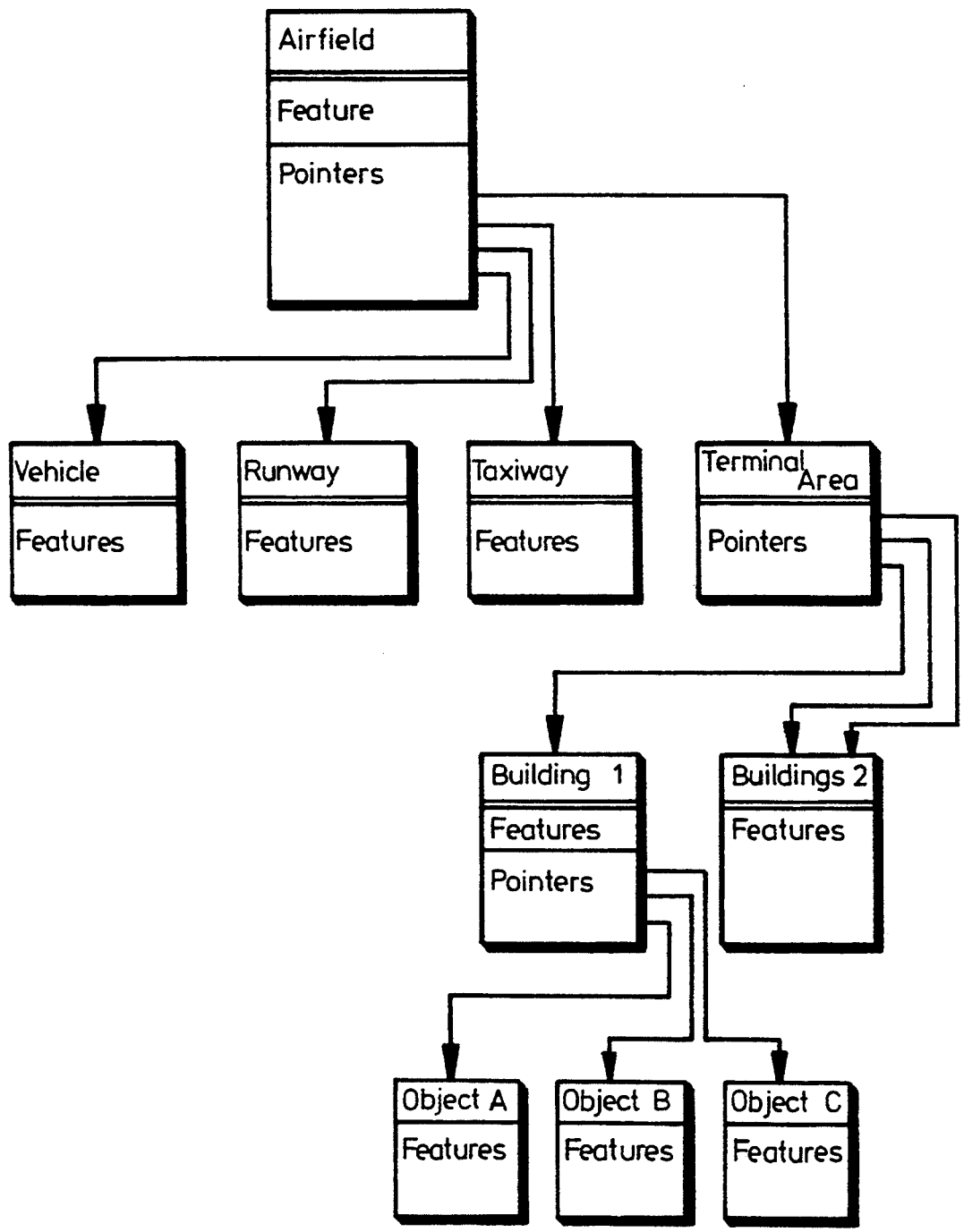
FIG. 4 illustrates the way in which a particular set of objects are inter-related in a tree structure of the type illustrated in FIG. 3.

FIG. 4 illustrates by way of example a possible object tree describing an airfield. It will be appreciated that such an object tree will form only a small part of a full model and therefore the simplified model of FIG. 4 is given merely for the purposes of illustration.

In FIG. 4, ten objects are shown as follows:
1. An "airfield" object storing features such as ground polygons and light points positioned on the ground polygons and pointers to other objects;
2. A "vehicle" object storing features defining a vehicle which may move relative to the airfield;
3. A "runway" object storing polygon features defining the runway surface, markings on that surface, and light points;
4. A "taxiway" object storing polygon and light point features defining the taxiway of the airfield;
5. A "terminal area" object storing no features but pointers to other objects;
6. Two "building" objects (building 1 and building 2). Building 1 stores polygon features and pointers to other objects. Building 2 stores features describing a single building identical versions of which appear at positions defined by the two pointers from the terminal area object to the building 2 object;
7. Three objects (A, B and C) which store respective groups of features together making up the building 1 object.

The "tree" of FIG. 4 is traversed by the TE illustrated in FIG. 2. The control logic 14 reads out the first relevant object (airfield) and it is received by a first object processor. That object processor then directs the control logic 14 to read out data from the next level objects in the tree (vehicle, runway, etc.) into unoccupied object processors. The cycle is repeated progressing through the tree until data from all of the relevant objects has been read into the processors. Thus processing proceeds along each branch of the tree simultaneously and the processing time is as a result minimized.

Figure 5:
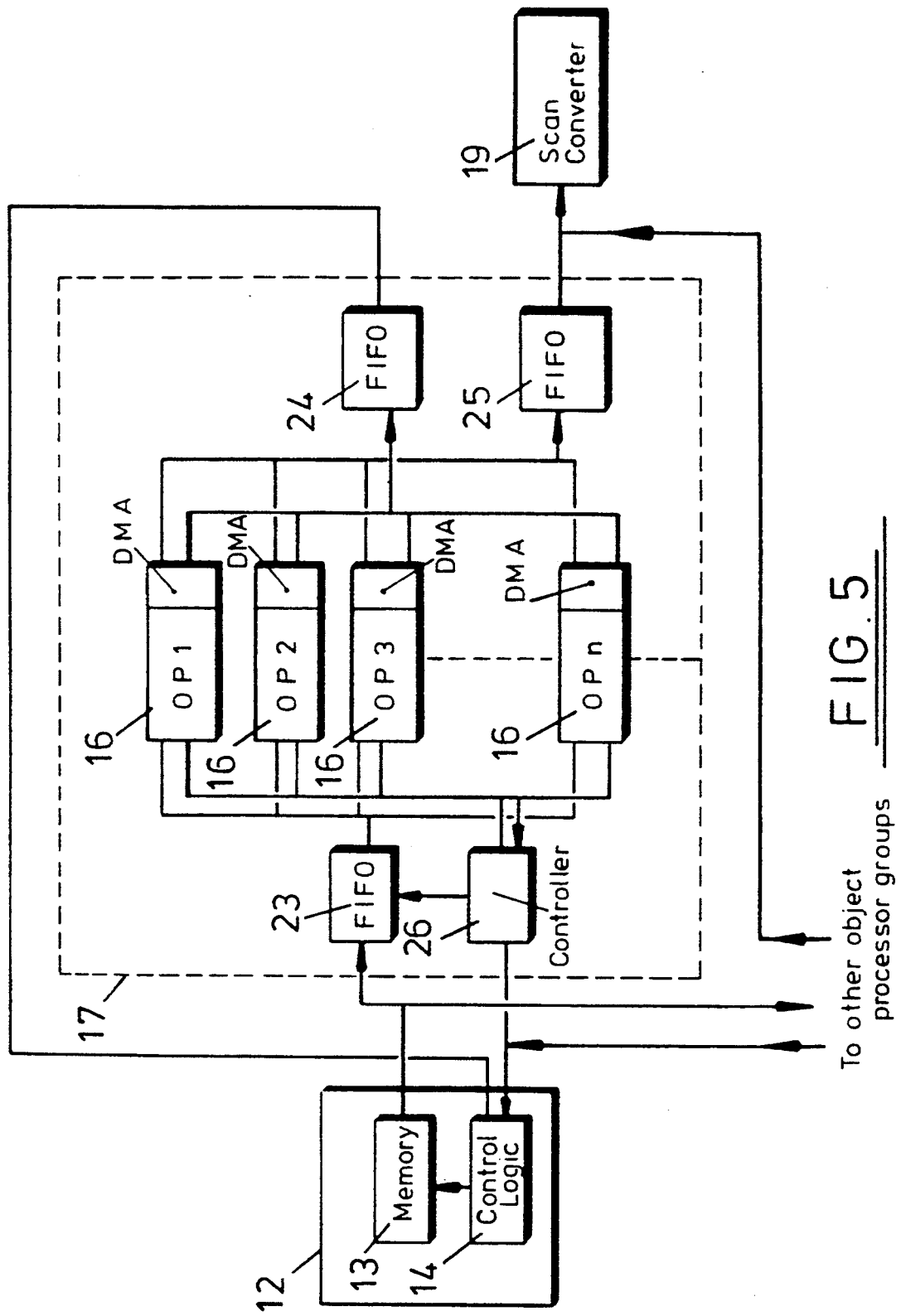
FIG. 5 is a schematic block diagram of an object processor incorporated in the transformation engine of FIG. 2.
Figure 6:
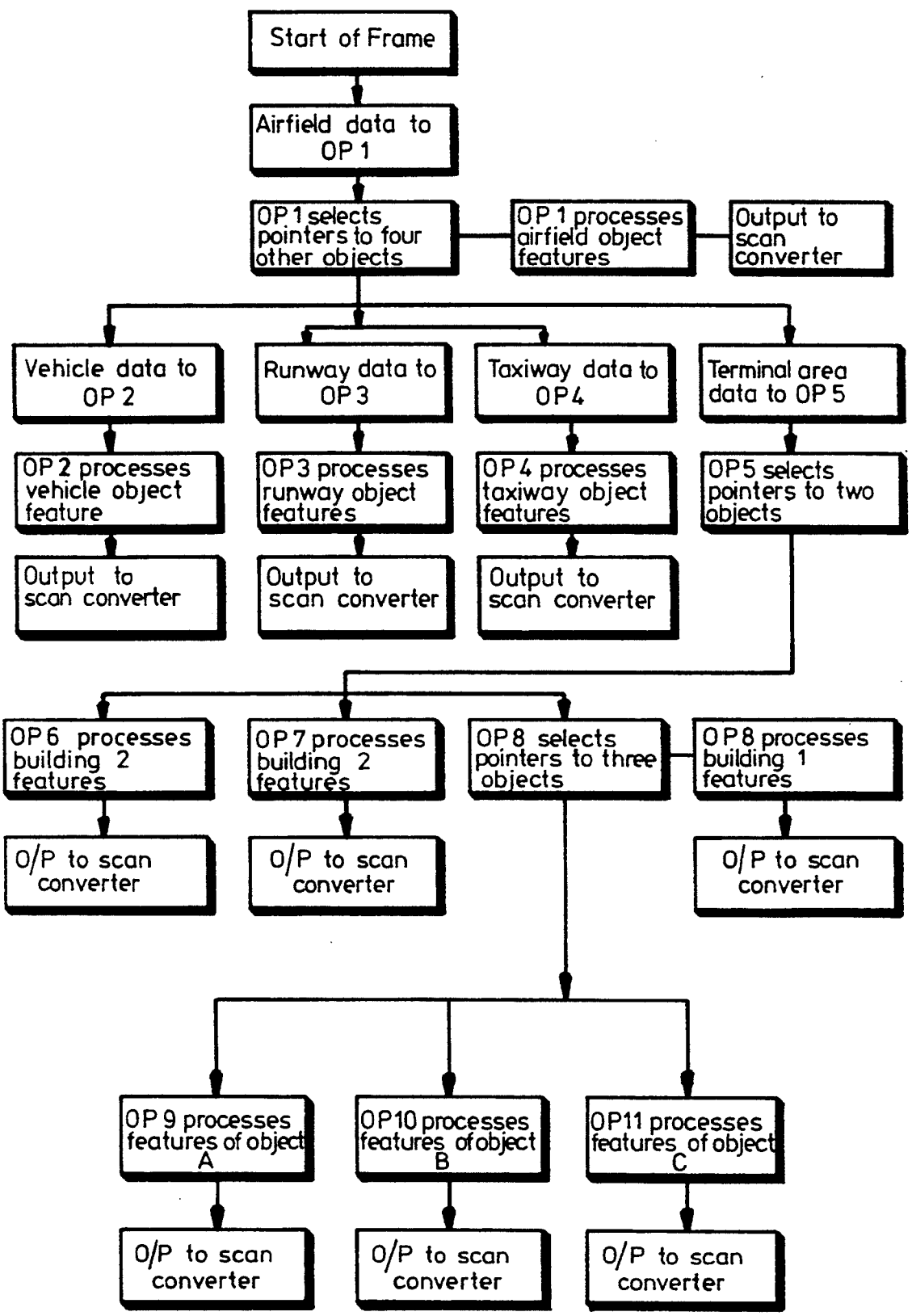
FIG. 6 illustrates the operation of the object processor illustrated in FIG. 5.

FIG. 5 illustrates the object processor in greater detail and FIG. 6 illustrates the distribution of processing tasks in the case of the simple example described in FIG. 4. In FIG. 5, the n object processors 16 of one group 17 are identified as OP1, OP2 . . . OPn. The processors are connected in parallel to three FIFO circuits 23, 24 and 25 which in turn are connected to the CADB 12 and the scan converter 19 (FIG. 2). A local controller 26 controls the operation of the n processors and the control logic 14 controls the distribution of data from the CADB to the processors, the data being fed to the object processors via FIFO 23. The FIFO 24 returns inputs to the control logic 14, and the FIFO 25 passes processed feature data to the scan converter 19.

The processor groups 17 are connected to the CADB 12 by a parallel bus. Data is read out from the memory 13 onto the bus. If a group 17 of processors has at least one idle processor, that group is capable of receiving object data for processing- The groups are addressed one at a time, each group being addressed during a respective time slot. If when a group is being addressed, the FIFO 23 of that group is empty, and one of the group's processors is idle, object data is read out via the bus into the FIFO 23. A signal on the bus indicates that the object data has been received for processing, that signal preventing any other processor being allocated the same object data, and enabling the read out of another object data packet onto the bus.

Within each group 17, object data is distributed in an analogous manner to object data distribution from the CADB to the processor groups, that is each object processor is addressed one at a time, and if an object processor is idle when addressed that processor receives the then available object data packet. Thus object data is distributed in an efficient manner. This efficiency may be further enhanced if any group of processors which is completely idle is given priority to receive object data.

Each object processor contains a microprocessor, 128K byte RAM and a DMA controller. The RAM is organized to store object data, a tree "walking" program which is operative when the tree is being walked to identify relevant data, and a feature transformation program. The processor operates firstly in tree walking mode and then in transforming mode.

In tree walking mode, each object processor looks at the pointer data of the object that it is working on. That data includes, for each pointer, the "size" of the object pointed to (that is the radius of a sphere centered on the object center and enclosing all of the object), and the "position" of the object pointed to, that is the translation and rotation necessary to convert the pointed to object from its own object space to that of the pointed from object. The object processor decides which of the pointed to objects is potentially within range and within the field of view by reference to the pointer data and the current eyepoint position and viewing direction. Objects outside the field of view are not processed further. Pointers to objects within the field of view are returned to the CADB 12 and the pointed to objects are then read out by the control logic 14 to idle processors, each idle processor receiving a respective object.

In transformation mode, each object processor works on the features (rather than pointers) stored in the object that it is processing. For each feature, the processor performs the necessary geometric transformations, such that the output delivered to FIFO 25 is a stream of feature (e.g. polygon or light point) data suitable for subsequent processing by reference to screen based coordinates. Thus the object processors transform the contents of the active database from a tree structured set of models, each in its own coordinate frame, into a form in which all the primitives in each model have been transformed into screen space. The transformation algorithms used are conventional and are not described in detail herein, but the calculation of feature attributes of particular relevance to the operation of the scan converter is described below.

FIG. 6 illustrates a "tree walking" sequence appropriate for the simple example illustrated in FIG. 4. At the start of a frame, assuming that the viewing position is such that all the airfield is within range and within the field of view, the feature and pointer data of the root node (airfield) is output to the processor OP1. OP1 selects the pointers from that object, performs the necessary transformations, and returns the selected pointers to the control logic 14. The four pointed to objects are then output to processors OP2 to OP5. OP1 then transforms the airfield object features into screen space and outputs the transformed feature attributes to the scan converter 19. OP1 is then available for another processing task.

Processors OP2 to OP4 receive objects with no pointers and thus perform the necessary transformations of the object features and output the transformed feature attributes to the scan converter 19. The object delivered to OP5 stores no features but does store three pointers to two other objects. These pointers are processed and returned to the control logic 14. As the two objects must be within the field of view given that all of the airfield is within the field of view, the corresponding object data is read out to processors OP6, OP7 and OP8. Processing continues in this manner using processors OP9 to OP11 until all the objects have been processed. It will be noted that the "building 2" object is processed twice. This is because the object "building 2" is pointed to twice indicating that this object appears at two different positions in the world space model.

Thus the processors operate in parallel on data which is distributed in a highly efficient manner. The processors can begin the transformation task as soon as feature data is delivered to a processor. This occurs almost immediately if the root node stores feature data as well as pointer data. Prior art object processors typically take four milliseconds to sort feature data before transformations can start. In a typical frame period of sixteen milliseconds this means that very little of a frame period is dead time in the case of the present invention in contrast to a dead time of one fourth of a frame period in prior art devices.

In FIG. 6 it is implied that all the processing tasks take the same amount of time and that tasks are distributed to processors in the order OP1, OP2, OP3 etc. In practice, this need not be the case, as otherwise arbitration on the communications bus of the first group of processors would slow down operations whilst other groups of processors are idle. With this in mind, distribution of tasks may be managed as described above so that for example the first object read out from the tree could go to OP14 of group 3, the second object could go to OP6 of group 7, and so on. Thus processing of data is evenly distributed between the groups on a random basis.

Although as mentioned above in a practical system the object tree would be much more complex than that illustrated in FIG. 4, the level of complexity does not affect the fundamental relationship between linked objects. Thus even in complex object trees the world space model can be organized in a very flexible manner, which makes model database production relatively easy. This is of fundamental importance as world space model production is a substantial overhead contributing to the cost of any simulator.

In addition to a rotation matrix and a translation vector that together enable the transformation of an object from object space into eyepoint space, objects also consist of data including the following:

A. A fade level of detail (FLOD) factor to be applied to the object. The FLOD factor is determined by the system manager 2 (FIG. 2) in response to data returned to the SM 2 from the CADB 12. This data flow is indicated by the return path shown in FIG. 2 between the CADB 12 and the SM 2.

B. A channel identity (assuming a multichannel system) that is used by the object processor to access associated environment data.

C. A light point draw order task number used to associate all calligraphic light points in the object with a draw priority number. This maintains an efficient draw order for controlling the projection of calligraphic light points.

Objects are thus blocks of data defining features such as polygons and light points, together with their position and orientation in space, and optional pointers to other objects. Each object is self-contained, and does not share any data with other objects. Within an object however maximum use is made of shared data. For example, polygons do not contain actual vertex coordinate data, but simply pointers to entries in a vertex block. This has two benefits. Less memory is required in the CADB and the processors, and many attributes of features need only to be processed once as the results can be stored. This is important for example where two features share common vertices.

Thus, whilst working on objects rather than individual features contributing to objects, each object processor firstly decides whether or not a pointed to object is within range, and then decides whether or not an in-range object is within the field of view. Individual features contributing to objects which pass these two tests are then transformed and passed to the scan converter for further processing.

Object Range Cull

Any object that is too far away to be seen from the eyepoint is culled, that is to say no request is made to process that object. The range cull is performed by comparing the Z component (in eyepoint space) of the nearest point of a bounding sphere containing the object with a maximum visible range associated with that object. As mentioned above, objects are modelled in their own object space where the object origin is the origin of the object coordinate system and the object center is the center of the bounding sphere containing all of that object. The object space origin to object center translation is also stored. The following procedure is then followed:

a. The Z component of the translation is transformed to eyepoint space and added to the Z component of the objects (origin) translation.
b. The objects bounding sphere radius is subtracted from the Z component to give the distance from the eyepoint to the nearest point of the bounding sphere.
c. The SM supplies a maximum range at which objects should be selected. If the Z calculated above is greater than the maximum range, then the object is culled. That object and any object pointed to only from that object is automatically discounted so far as the frame then being processed is concerned.

The effect of using just the Z component (a line drawn from the eyepoint through the center of the display screen) instead of the slant range to that object is that objects at the sides of the screen will not be culled when sometimes they could be. Such objects would nevertheless be culled as a result of the level of detail selection mechanism (not described in detail herein) which uses the slant range from the eyepoint to the object.

Field of View Cull

The field of view cull is a check which determines if any pointed to object can be seen within the boundaries of the display screen. Any object that is too high, too low, too far to the right or too far to the left is culled, that is no request is made to process that object. Rather than perspecting the object into screen space and checking if the object is on the screen, an inverse perspective transformation is performed on the screen boundaries and the field of view cull is performed in eyepoint space. In effect, the maximum x and y for the field of view (in eyepoint space) are calculated at the objects maximum Z (center plus bounding sphere radius). Objects are more likely to be to the side of the field of view than above or below it. The side field of view cull is thus performed first. The x and y values defining the objects bounding sphere extent are calculated in the same way as Z is calculated for the range cull. The calculated values are compared to the screen boundary values. Any object completely off the screen is culled.

For all objects not culled as described above, the features stored at those objects must then be processed in the object processor. This processing involves five basic procedures, that is backface removal (culling all features which cannot be seen from the eyepoint as they face away from the eyepoint), plane equation coefficient calculation (calculating the coefficients of the plane in eyepoint space of each feature that is potentially visible), field of view culling (culling all features which are completely off the screen), bounding box calculation (the maximum and minimum screen space x and y extents of each feature), and line equation calculations (the calculation in screen space of equations describing lines defining the basic geometry of the features being processed). Before describing these processes it is appropriate to explain the basic geometrical attributes assigned to the various features which are to be processed.

Modelled Features

In the world space model, there are essentially three different types of feature, that is quadrilateral polygons (hereinafter polyquads), raster light points (hereinafter RLPs), and calligraphic light points (hereinafter CLPs). The geometrical attributes of these features which are relevant to the present description are set out below:

1. Polyquads—these are polygons described by four vertices and a surface normal. Triangular polyquads simply have a null vertex.
2. RLPs—these are described by a position, two direction vectors for asymmetrical directionality, and a normal vector.
3. CLPs—these are described in exactly the same terms as RLPs but are flagged to distinguish them from RLPs simply because they are projected as high intensity points after all other feature types have been displayed in the normal raster scan procedure.

RLPs and CLPs will in many cases be positioned on another feature, for example a polyquad describing the wall of a building. If so, the light point normal is the same as the surface normal of the feature upon which the light point is positioned. For light points which are not mounted on another feature, for example light points simulating free standing lights which can be seen from any direction, a default normal vector is defined which is parallel to the line of sight to that light point from the eyepoint.

Thus all features have a defined position in world space (referenced to world space from object space), and a normal vector defined in world space.

The object processors perform essentially the same procedures for backface removal and plane equation attribute calculations for all feature types, but subsequently perform different procedures for polyquads, and light points (both RLP and CLP).

In addition to processing object data, the object processors also process environment data.

The environment data is processed each field and falls into four categories:

(a) Data broadcast to all object processors (e.g. system load coefficients)
(b) Data broadcast to all object processors, transformed by one processor and transmitted to the RE (e.g. screen dimensions)
(c) Data sent to one object processor for processing and onward transmission to the RE (e.g. sun vector)

(d) Data which is sent straight through to the RE with no processing (e.g. texture maps).

The processing of environment data is not directly related to the present invention and therefore will not be described further herein.

Backface Removal

The object processor starts feature processing with backface removal. For each feature, the surface normal is rotated into eyepoint space and a control vertex on the feature is rotated and translated into eyepoint space. This produces plane equation coefficients (A, B, C) and control vertex coordinates ($x_c$, $y_c$, $z_c$). These are substituted in the plane equation:

$$Ax + By + Cz = -D$$

to yield "$-D$". Backfacing planes (which face away from the eyepoint space origin) have a positive value for "$-D$" and are culled. This effectively discards all backfacing features.

Plane Equation Attributes Calculation

For all surviving features, "$-D$" is normalized to:

$$-2.0 > D > = -1.0$$

and used to produce the following attributes:
A/D.kx
B/D.ky
C/D kx and ky are constants which relate the attributes to the size and aspect ratio of the screen on which the image is to be displayed. If the screen is square, kx=ky.

The plane equation attributes are passed to the scan converter and are constant for each field.

Line Equation Calculations

Polyquads

Figure 7:
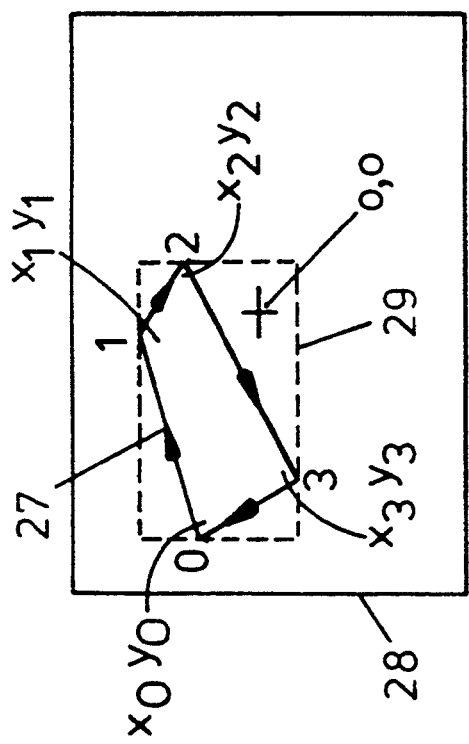
FIGS. 7 and 8 illustrate the derivation of line equations which are used to assess the position of features in screen space in the embodiment of the present invention.

The line equation coefficients of the edges of a polyquad may be readily calculated by the object processor from the screen space vertices of the polyquad as described with reference to FIG. 7. FIG. 7 illustrates the calculation of the line equation:

$$e.x + f.y = -g$$

for a line 27 making up one edge of a polyquad. The polyquad is defined between vertices 0, 1, 2 and 3 having screen space coordinates ($x_o$, $y_o$), ($x_1$, $y_1$), ($x_2$, $y_2$) and ($x_3$, $y_3$). The display (screen) boundary is indicated by line 28, the screen coordinate origin (0, 0) being at the center of the screen.

e from the normalized line equation can be derived from the following:

$$e = (y_1 - y_0)/\text{sqrt}\,[(y_1 - y_0)^2 + (x_1 - x_0)^2]$$

f from the normalized line equation can be derived from the following:

$$f = (x_0 - x_1)/\text{sqrt}\,[(y_1 - y_0)^2 + (x_1 - x_0)^2]$$

Thus e and f can be readily calculated, and g can be readily calculated by substituting the calculated e and f values and the coordinates of either vertex into the line equation.

RLPs and CLPs

No edge equations are calculated for light points.

The polyquad line equations enable a simple screen field of view test to be applied. Assuming that the screen is rectangular, any polyquad the nearest edge of which in screen space is more distant from the screen center in the direction perpendicular to the edge than the corners of the screen must be outside the field of view. Thus, assuming that the distance from the screen center to each screen corner is gcrit, and the perpendicular distance to a feature edge is g, then the feature is culled (not processed further) if:

$$g < -g\text{crit}$$

for each feature edge.

The signs of the polyquad edge equation coefficient are formulated so that the set of polyquad edges form a closed string of connected vectors running in the clockwise direction, and the distance g to each edge is calculated so as to be negative if the screen center is to the left hand side of the edge line equation. With these sign conventions, the feature may be culled if g is less than a minus gcrit for any one edge of the polygon. This simplifies the logic required to decide whether or not a polyquad can be culled.

Polygon screen culling as described above assumes that the screen is rectangular. The same technique may be used however to determine whether or not a polyquad impacts a display area which is not rectangular. The technique requires a reference point (in the described case the screen center), a limiting distance (in the described case the distance from the screen center to the screen corner), and an arrangement for comparing the distance to edges of the polyquad from the reference point with the limiting distance. Providing the limiting distance is selected to be large enough so that any edge at a greater distance must be outside the display area the distance comparison can be used to identify polyquads that should be culled.

Bounding Box Calculations

Polyquads

Referring again to FIG. 7, the bounding box is the area of the screen indicated by broken line 29 and represents the full range of screen space x and y values which might lie on the polygon feature. In the illustrated case, the bounding box edges are as follows:

Left $x = x_o$
Right $x = x_2$
Top $y = y_1$
Bottom $y = y_3$

The bounding box is thus defined by four line equations:

$$x - x_o = 0$$

$$x_2 - x = 0$$

$$y_1 - y = 0$$

$$y - y_3 = 0$$

Or in general:

$$x - L = 0$$

$$R - x = 0$$

$$T - y = 0$$

$$y - B = 0$$

where L, R, T and B are left, right, top and bottom extents respectively of the bounding box.

RLPs and CLPs

Figure 8:
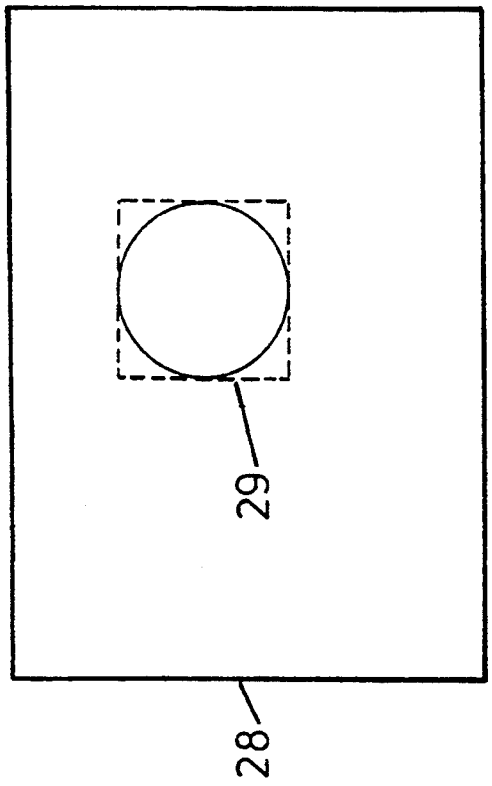

Light points do not have vertices from which bounding boxes can be directly derived, but rather a single point (in world space) on which the light point is centered. RLPs are circular in screen space and are sized according to range. Thus a bounding box is calculated as a function of the size of the light point in screen space. CLPs are also circular in screen space, and also have size and bounding boxes calculated as a function of range, subject to a maximum size of for example two by two pixels to take into account the way in which calligraphic light points are projected. FIG. 8 illustrates the bounding box 29 of a light point.

The signs of both the polygon and bounding box edge equation coefficients are formulated so that the set of polygon edges and the set of bounding box edges each form a closed string of connected vectors running in the clockwise direction.

Once the object processor has completed the processing of a feature, the attributes (including edge coefficients and bounding boxes) are output to the scan converter. The function of the scan converter is to review the screen coordinate geometrical data of each feature received from the object processors and to decide whether or not that feature is potentially relevant to one or more of a series of areas into which the screen area is divided. Before describing the operation of the scan converter, the way in which the screen is divided into sub-areas for processing purposes in the rendering engine will be described with reference to FIG. 9.

Subdivision of Display Screen

Figure 9:
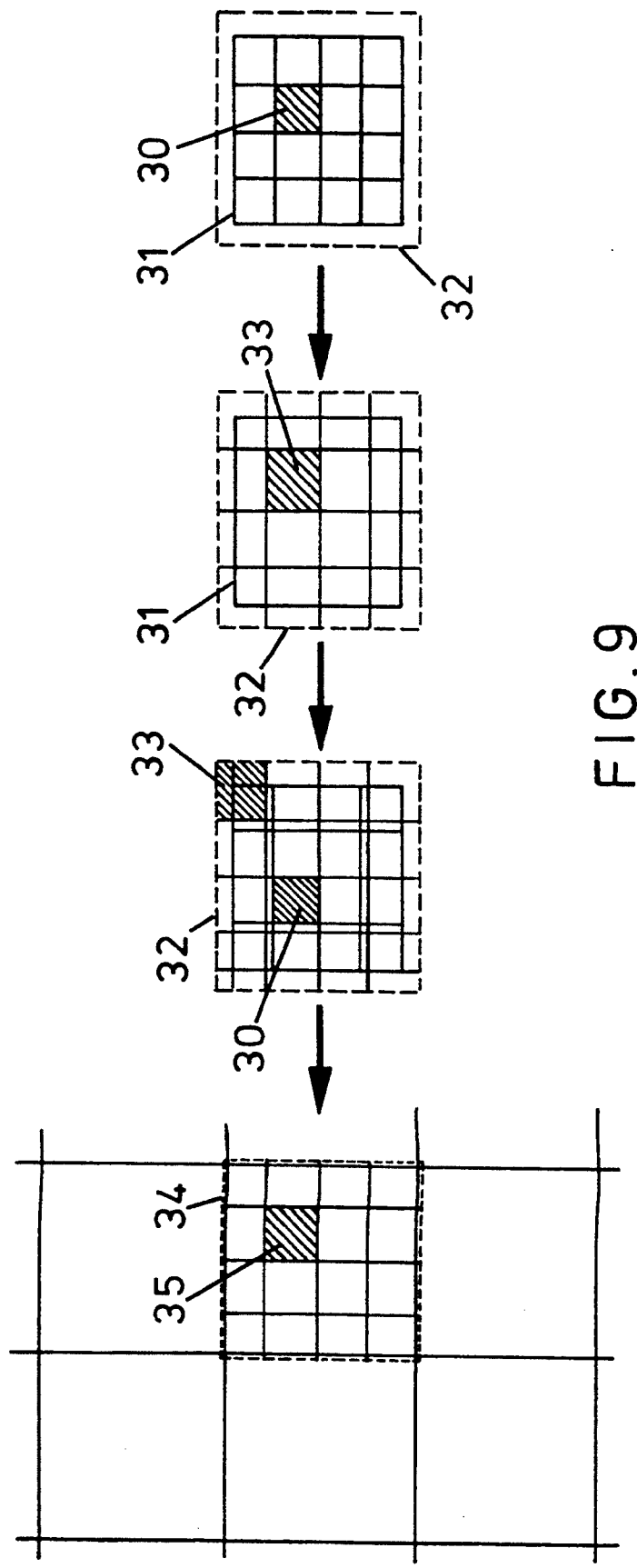
FIG. 9 illustrates the inter-relationship between various sub-areas of screen space in the embodiment of the present invention.

The displayed image is made up from a regular array of pixels which do not overlap and which together cover all of the screen. Each pixel is projected by the raster scan display device as an area of uniform color and intensity although pixels may be overwritten by calligraphic light points as described below. FIG. 9 includes four illustrations of various subdivisions of the screen, the leftmost illustration being to one quarter of the scale of the three other illustrations.

In FIG. 9, the shaded areas identified by reference numeral 30 each correspond to one pixel. The screen is divided into sub-areas or cells each covering a respective rectangular array of pixels, in the illustrated case a four by four array. Numeral 31 in FIG. 9 points to the boundary of one cell. Adjacent cells do not overlap. Superimposed on each cell is a pseudocell which covers the respective cell and a half pixel boundary around that cell. Broken lines 32 in FIG. 9 correspond to a pseudocell boundary. Thus adjacent pseudocells overlap each other. Each pseudocell is divided into a regular array of abutting pseudopixels, e.g. a four by four array of pseudopixels. The shaded areas 33 in FIG. 9 each corresponds to one pseudopixel. Superimposed on the pseudocells are supercells, each covering a respective rectangular array of pseudocells, e.g. a four by four array of pseudocells in the illustrated case. Thus adjacent supercells overlap each other. The broken line 34 indicates a supercell boundary, and shaded area 35 one pseudocell within that supercell. Thus each supercell covers sixteen pseudocells, and those sixteen pseudocells together cover sixteen cells plus a half pixel wide boundary around the edge of those sixteen cells. It is necessary for adjacent supercells, adjacent pseudocells and adjacent pseudopixels to overlap to achieve anti-aliasing as described below.

For the illustrated case of a four by four pixel cell, and a four by four pseudocell supercell, and assuming a display area of 1024 by 1024 pixels, there are 64×64 supercells and 256×256 pseudocells.

Scan Converter

For each feature delivered to the scan converter by the object processors, the scan converter identifies all of the supercells which are at least partially overlapped by that feature. The scan converter distinguishes between polyquads and other features. In the case of polyquads, both the line equations defining the edge of the polygon and the line equations defining the bounding box are processed. In the case of the other features (light points) only the bounding box edges are processed.

The scan converter assigns an identity (ID) to each feature, locates the supercells impacted by that feature, and passes the polyquad ID to the scan converter store 21 (hereinafter referred to as the supercell store).

Figure 10:
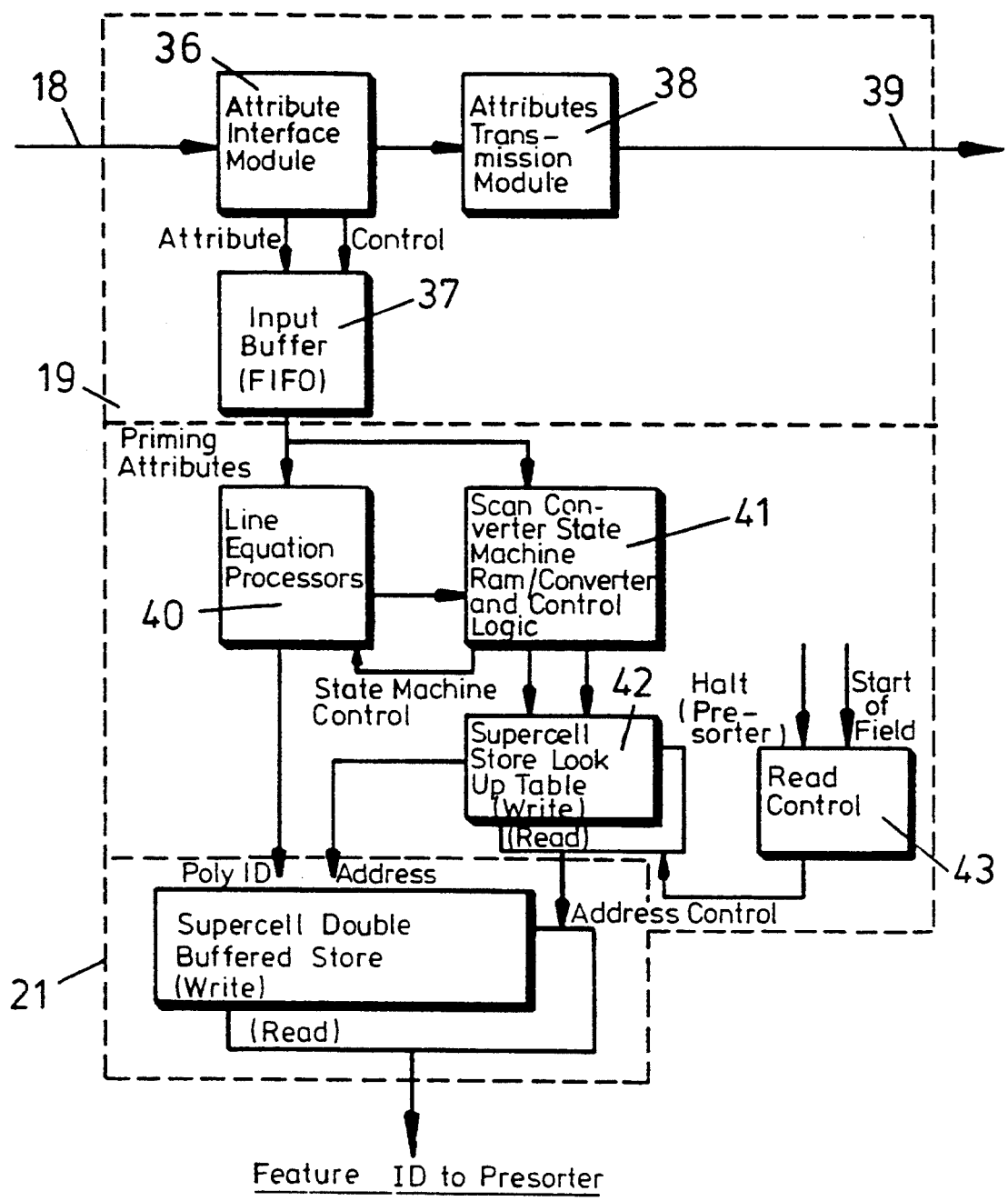
FIG. 10 illustrates a scan converter and store arrangement of the type described more generally with reference to FIG. 2.

FIG. 10 is a schematic illustration of the components of the scan converter 19 and supercell store 21 of FIG. 2. The scan converter store 21 stores date relevant to individual supercells. Attributes are received from the TE on input 18 (FIG. 2), one feature at a time, and an attribute interface module 36 inserts a feature ID into the data stream representing each feature for distribution to a scan converter input buffer 37 and an attribute transmission module 38 feeding an attribute bus 39 communicating with the attribute store 22 (FIG. 2).

The interface module 36 passes to the buffer 37 only geometrical attribute data necessary for the scan conversion processing. The buffer 37 allows the received data to be stored at optimum speed without it being necessary to slow down the flow of attribute data from the TE. The buffer output supplies the attribute data to an array 40 of seven line equation processors providing outputs to a state machine 41 that in turn controls the line equation processors. The components 40 and 41 correspond to the logic unit 20 of FIG. 2. A write coordinate look-up table 42 directs feature IDs to the appropriate location in the write section of the double-buffered supercell store. At the start of the next frame a read control unit 43 controls a read section of the coordinate table 42 to read data from the supercell store.

Each line equation processor is in the form of an identical application specific integrated circuit (ASIC) which can be controlled by the state machine 41. Each of these ASICs is referred to herein as a Dlet and performs a variety of functions depending on the mode selected. The detailed structure of each Dlet is of no great importance to an understanding of the present invention however and is therefore not described here. It will of course be provided with the circuit components necessary to perform the simple arithmetic operations described below.

Three of the Dlets in array 40 share the task of deciding whether or not a feature bounding box impacts a supercell. The other four Dlets share the task of deciding from the edge equations of a polyquad whether or not that polyquad impacts a supercell. The ID of each impacting feature is stored in the supercell store. The supercell store is schematically illustrated in FIG. 11 and it will be seen that it comprises a storage stack in respect of each supercell, each stack being capable of storing up to 256 feature IDs. Thus for the example quoted above, there are 64×64 stacks, and each stack stores a simple record (IDs only) of those features which impact the respective supercell.

Bounding Box Processing

Scan conversion of the bounding box of any feature starts from the bottom of the box, works in the x direction across the box until all the supercells between or overlapping the left and right edges of the box have been identified, and then works upwards through the box one row of supercells at a time. The supercell being processed has unique center coordinates in screen space and these are used to compute the distances dL, dR, and dT of the supercell center ($x_{sc}$, $y_{sc}$) from the bounding box edges to left, right and top:

$$dL = x_{sc} - L$$

$$dR = R - x_{sc}$$

$$dT = T - y_{sc}$$

It is not necessary to calculate the distance to the bottom of the box as scan conversion starts at the bottom and always proceeds upwards.

Each of the three distances calculated as described above is compared to the distance from the supercell center ($x_{sc}$, $y_{sc}$) to the supercell edges. In the example described above the supercell is square and thus it can be assumed that the supercell has dimensions of 2a square. Then, considering the left-hand edge of the bounding box:

If $dL < -a$, the supercell is to the left of the left bounding box edge. This is indicated by the generation of an outcode 01.

If $-a < = dL < = +a$, the supercell is the leftmost supercell in its row which is impacted by the bounding box. This is indicated by an outcode 10.

If $+a < dL$, the supercell is to the right of the left-hand edge of the bounding box. This is indicated by outcode 11.

Codes 01, 10 and 11 can be derived in this way for the left, right and top edges of the bounding box. Any one code 01 would indicate that the supercell was outside the bounding box. Any one code 10 would indicate a supercell intersected by one of the edges of the bounding box. This is used to control the direction of the bounding box scan efficiently. For example, a feature could have a bounding box as illustrated by the line 44 in FIG. 12. The grid illustrated in FIG. 12 indicates the relative disposition of the supercell boundaries relative to the bounding box 44. Supercells do of course overlap slightly but this is not indicated in FIG. 12. The scan converter can be arranged to go to the supercell within which the bottom left-hand corner of the bounding box is included, to progress in the positive x direction across the bounding box until an outcode 10 is produced as a result of the supercell then being processed overlapping the right-hand bounding box edge, to progress one step in the positive y direction and then in the negative x direction until an outcode 10 is produced for the left-hand edge of the bounding box, and so on. Thus in the case illustrated in FIG. 12 the scan converter will proceed through the supercells overlapped by the bounding box 44 in the order indicated by numbers 1 to 20.

In the case of light points, only bounding box tests are conducted to determine supercell impact. In the case of polyquads however both bounding box and polygon edge equation tests are conducted, the traversal route of the supercells then being determined by the combination of the results of the two tests.

Polyquad Edge Equation Processing

Scan conversion of a polyquad starts from the supercell within which the bottom vertex of the polyquad is located. (If there are two "bottom" vertices of the same y coordinate, the leftmost is selected). The bottom vertex is determined by the transformation engine and in the case illustrated in FIG. 7 corresponds to the vertex ($x_3 y_3$). The four Dlets allocated to polyquad edge equation processing operate as described with reference to FIG. 13.

In FIG. 13, square 45 represents a supercell, and quadrilateral 46 represents a polyquad. For each edge of the polyquad 46, the perpendicular distance d to the edge from the supercell center is calculated, the perpendicular distance dcrit from the center of the supercell to a line that just touches the supercell and is parallel to the polyquad edge is calculated, and the difference between the two is calculated.

$$dcrit = |e.a| + |f.b|$$

where e and f are the coefficients of the line equation and a and b are the half supercell width and height respectively.

The perpendicular distance d is derived from:

$$d = ex + fy + g$$

where e, f and g are the coefficients of the line equation for the polyquad edge.

The sign of d depends upon whether the center of the supercell is to the left or right of the line. The sign of dcrit does not change. Thus outcodes 01, 10 and 11 can be produced to signify the following:

$d < -dcrit$ (outcode 01)

$-dcrit = < d = < dcrit$ (outcode 10)

$dcrit < d$ (outcode 11)

Outcode 01 indicates that the supercell is wholly to the left of the polyquad edge. Outcode 11 indicates that the supercell is wholly to the right of the polyquad edge. Outcode 10 indicates that the supercell straddles the polyquad edge (or an extension of that edge). Four outcodes 11 indicate that the supercell is completely covered by the polyquad. A complete polyquad impact decision can be made however by simply combining the four outcodes. If the four outcodes are applied to a pair of AND gates, the first bits of each outcode being applied to one gate, the second bits to the other AND gate, the result will be a two bit output capable of indicating four secondary outcodes as follows:

00—supercell totally outside polyquad
01—supercell totally outside polyquad
10—supercell partially covered by polyquad
11—supercell totally covered by polyquad The latter two outcodes unambiguously indicate that the supercell being processed is impacted by the polyquad being processed. The polyquad ID is thus delivered to the appropriate supercell store stack.

Although in the case of polyquads an unambiguous output can be provided for any one supercell to indicate whether or not that supercell is at least partially covered by a polyquad, the bounding box test referred to above does provide further information which is useful to control the traversal of the polyquad in an efficient manner and also to deal with special cases, for example a polyquad bounding box lying wholly within a supercell.

One possible polyquad traversal method which could be used to traverse a polyquad more efficiently than following a simple bounding box test would be to start from the lowermost vertex supercell, proceed to the left until a supercell is reached which is either clearly outside the polyquad or includes the leftmost bounding box edge, to then return to the starting point and proceed to the right until a supercell is reached which is either clearly outside the polyquad or includes the right-hand edge of the bounding box, to then proceed to the next higher row of supercells and repeat the process outlined above. The starting point in each row of supercells could be selected to correspond to approximately the midpoint of the supercells deemed to be impacted by the polyquad in the immediately adjacent lower row.

Referring again to FIG. 10, the write coordinate look-up table 42 directs each feature ID to the appropriate location in the write section of the double-buffered supercell store. Upon receipt of the next "frame swap" signal, the read control unit 43 reads data from the supercell store, the data being read out from each supercell store stack in turn. The rate of data readout is also controlled by a "halt" input received from the presorter which is the next component in the image generator pipeline.

Thus it will be appreciated that all the processes carried out by the scan converter are simple to execute. High speed execution is of course necessary to achieve a throughput sufficient for real time displays but such speed can be achieved by appropriate ASICs. In the described system seven Dlet ASICs are provided, four for processing polyquad edge equations and three for processing bounding box edges. There is no reason however to prevent the provision of more parallel processing paths to increase throughput. Thus the scan converter does not represent a bottleneck limiting maximum throughput. Also the algorithm can handle convex polygons with any number of edges.

The scan conversion procedures described above have certain features which enhance system efficiency. These may be summarized as follows:
a) Normalization of the edge equations so that each edge function (E(x,y)=ex+fy+g) is equal to the distance of the point (x,y) from the edge,
b) Use of dcrit for evaluating whether a pseudocell is inside, outside or straddling an edge of a polyquad,
c) Use of outcodes for determination of pseudocell status with respect to complete feature evaluation,
d) Use of effectively two parallel line equations,
e) Hardware implementation with parallelism.

Normalization

The line equation coefficients e,f,g are divided by a normalization factor n where $$n = sqrt\ [(x2-x1)^2+(y2-y1)^2]$$

n is actually the distance along the edge from vertex (x1, y1) to vertex (x2, y2).

The edge function ex+fy+g then represents a direct measure of the distance away from the line of the point (x, y).

dcrit

This is the critical distance away from the supercell center, against which the distance d (=ex+fy+g) of the feature edge from the supercell center is compared. It represents the displacement between the supercell center and the farthest supercell corner along a line perpendicular to the edge. The computation of dcrit is described above.

Outcodes

The outcodes are easily derived and can be readily combined using simple AND gates to forth a final outcode giving an unambiguous supercell impact assessment.

Two Parallel Line Equations

In order to find whether the supercell is inside, outside or straddling the supercell edge, the value of the edge function has to be compared against dcrit as follows:

if E(x,y) =d<-dcrit then supercell is OUTSIDE (outcode 01)

if E(x,y) =d>dcrit then supercell is INSIDE (outcode 11)

else supercell is STRADDLING (outcode 10)
[i.e. −dcrit<=E(x,y)=d<=dcrit]

The requirement for two sequentially executed compares with dcrit can be avoided if the two edge functions are initialized to $$F(x,y)=E(x,y)+dcrit\ \text{and}\ G(x,y)=E(x,y)-dcrit$$

whose outcodes can be determined by a simple test of the signs in parallel:
if F(x,y)<0 then outcode 01
if G(x,y)>0 then outcode 11
else outcode 10

These two edge functions effectively define two lines offset from the edge in question by the perpendicular distances dcrit and −dcrit respectively.

Hardware Implementation

The implementation in hardware as described above using a parallel array of Dlet ASICs to compute distances improves system throughput.

The Rendering Engine

Figure 14:
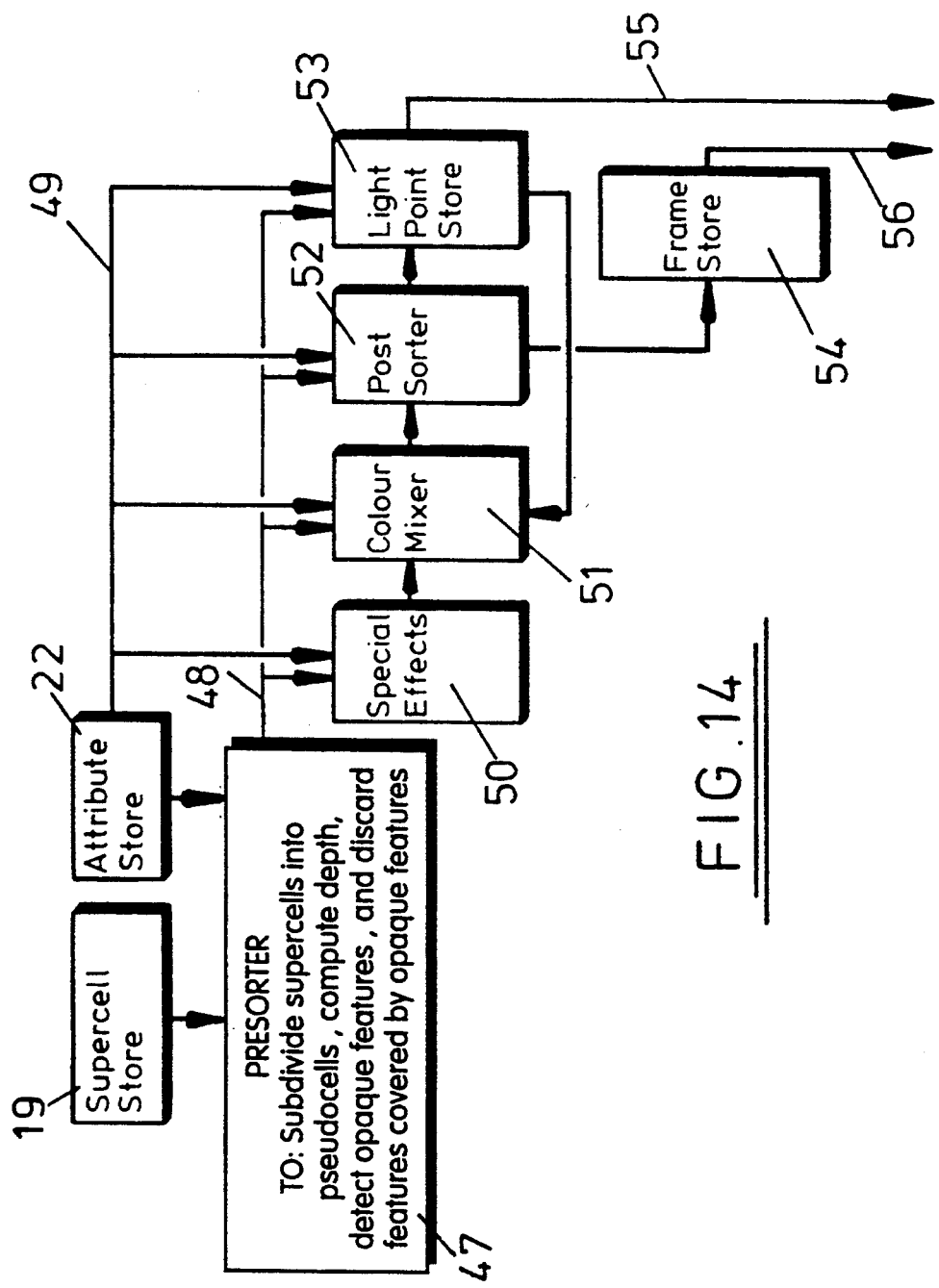
FIG. 14 is a schematic illustration of basic components of the rendering engine described in outline with reference to FIG. 1.

The RE 4 of FIG. 1 will now be described in outline with reference to FIG. 14. FIG. 14 shows the supercell store 19 and attribute store 22 of FIG. 2. It will be recalled that the supercell store and attribute store are both double-buffered, the contents of the stores being read out in response to receipt of a start of frame signal. The contents of the supercell store is read out supercell by supercell into a presorter 47 which also receives geometrical attribute data from the attribute store 22. The presorter and attribute store provide respective outputs 48 and 49 to a special effects module 50, a color mixer 51, a postsorter 52 and a light point store 53. The postsorter feeds raster image data to a frame store 54 and outputs 55 and 56 from the light point store and the frame store are delivered to the display device (display device 5 of FIG. 1). The output 55 controls calligraphic light point projection.

The function of the presorter 47 is to subdivide each supercell into a series of pseudocells, to compute the effective depth (distance from the eyepoint) of each feature at each pseudocell corner, to detect any feature which is opaque and fully covers a pseudocell, and to discard any features from consideration in respect of any one pseudocell if such features lie behind an opaque feature fully covering that pseudocell. Thus given a pseudocell size which is four by four display pixels plus a half pixel boundary, each supercell ID list will be considered for each of sixteen pseudocells in turn.

The IDs accumulated in the supercell store 19 are downloaded to the presorter 47 one stack at a time. Corresponding attributes are simultaneously downloaded to the presorter from the attribute store 22. Thus the presorter receives the contents of one stack, corresponding to one supercell, and processes the features identified by the stack contents, before the next stack is downloaded.

If the presorter indicates that a feature impacts (at least partially covers) the pseudocell being processed, a "fragment" data packet is generated and applied to the fragment carrying output bus 48. This data packet comprises only the screen space coordinates of the four corners of the relevant pseudocell and the impacting feature ID. The fragments of features thus identified are then processed in the special effects module 50, the color mixer 51, the postsorter 52, and the light point store 53.

The units 50 to 53 operate on the basis of pseudopixels. In the illustrated case sixteen pseudopixels fully cover (but do not extend beyond) a respective pseudocell. The corners of the pseudopixels are interpolated from the corners of the relevant pseudocell carried by the fragment bus. The special effects module 50 generates, for each pseudopixel of the pseudocell being processed, an output appropriate to whatever special effects the attributes of the feature being processed demand, e.g. texture effects, fog effects, landing light effects. This output is applied to the color mixer 51 where further effects such as ambient lighting are processed, the color mixer delivering an RGBT (red, green, blue, translucency) output for each pseudopixel to the postsorter 52. The light point store 53 processes light points in association with the color mixer and the postsorter as described in more detail below, the light point store 53 providing the output 55, and the postsorter providing an output to the frame store 54. The frame store provides output 56 to the raster display device 5 (FIG. 1).

The function of the postsorter 52 is to resolve the effects of surfaces hiding or partially hiding other surfaces. It does this by assessing the impact of features on an array of sampling points, accumulating and weighting the effects of such impacts, and providing a final RGB output for each display pixel to the frame store. Each pseudopixel fragment received by the postsorter covers a respective array of sampling points distributed across the pixel array corresponding to each pseudocell. Typically there may be two hundred sampling points, that is eight per pixel. (It will be recalled that each pseudopixel in the described example covers a four by four pixel array plus a half pixel wide boundary). The position of every sampling point relative to the four by four pseudopixel array defined for each pseudocell is known, and therefore it is necessary to decide, for each sampling point, whether or not a feature impacts that point, and only if impact is detected to accumulate the RGBT inputs to the postsorter from the corresponding pseudopixel.

Each sampling point may be overlapped by a large number of features and it is necessary to depth sort those features to discard those which are fully occulted by nearer (to the eyepoint) opaque features at that sampling point. To this end, the distance (from the eyepoint) of each feature at each sampling point is calculated. The RGBT and depth of the first feature impacting a sampling point is loaded into a respective store. Subsequent features are depth compared with the first stored feature, features being discarded from the store (or not entered) except for the current nearest opaque feature and translucent features nearer than the nearest opaque feature. Once all the features potentially relevant to a cell have been so processed, the cumulative effects of all the features identified in each stack are calculated to produce a final RGB output for each sampling point. Those outputs are then weighted and accumulated to produce a single RGB for each pixel. Each pixel will respond to contributions from the eight sampling points within its own boundary and sampling points within a half pixel wide border therearound, that is thirty-two sampling points in all ($1\times8+4\times4+4\times2$). The total area covering the thirty-two sampling points is thus equal to the area of a two by two pixel array but is centered on the center of one display pixel.

The attribute store 22, supercell store 19, light point store 53 and frame store 54 are all double-buffered so as to define the boundaries between separate stages in the pipe-lined system.

Before describing in greater detail how the system of FIG. 14 operates, it is appropriate to outline the advantages inherent in the general architecture of the system. Firstly, true hidden surface elimination is achieved without compromise. That is for every sampling point decisions on the relative priority of model features contributing to an image are based on direct comparisons between feature distances (from the eyepoint) at that sampling point. This also means that the modeller does not have to consider relative priorities, except for features sharing common planes, e.g. markings on runways. Such common plane priorities can be simply indicated by appropriate flags. Secondly, system dead time as data is assembled for processing is minimized, thereby improving throughput. Thirdly, the system structure is such that computationally intensive tasks can be effected by parallel processors. For example, the geometric transformations are distributed between parallel processors in the object processor, the presorter task can be distributed between parallel processors each responsible for a respective pseudocell or group of pseudocells, and the postsorter task can be distributed between parallel processors each responsible for a respective sampling point. The system throughput can be adjusted by merely adding or subtracting basic "building blocks" without major system redesign. Fourthly, the special effects module and color mixer functions can be of whatever complexity is required, without affecting the basic system architecture. Fifthly, as will be more apparent from the following description, the system is inherently capable of compensating for non-linearities in display devices. Sixthly, correct anti-aliasing with translucency and hidden surface removal is achieved.

The rendering engine described in outline above will now be described in greater detail.

Presorter

Turning now to the presorter 47 of FIG. 14, this receives feature IDs one at a time from the supercell store and decides which pseudocells in the respective supercell are impacted by the identified feature. The presorter receives the edge and bounding box equations for the identified features, and distinguishes between polyquads and light points. For polyquads, both edges and bounding boxes are used to determine overlap of the polyquad with a pseudocell. For light points, both CLPs and RLPs, only bounding box edges are used to determine overlap.

For each feature ID, and for each of the sixteen pseudocells making up the respective supercell, the presorter decides whether or not the feature impacts the pseudocell, whether or not the feature completely covers the pseudocell, and if it does completely cover the pseudocell whether or not the feature is opaque. For each feature, the depth (distance from the eyepoint) of the corners of the pseudocell projected onto the plane of the feature all also calculated. Feature IDs are then stored as a list identifying the nearest opaque fully covering feature and any nearer partially covering opaque feature or partially or fully covering translucent feature.

For polyquads the presorter calculates the perpendicular distance in screen space of each pseudocell corner to each edge of the polyquad. The presorter also calculates the distance in screen space to each edge of the bounding box of the feature. For light points distances can only be determined to the bounding box edges as light points do not have any other edges which can aid in a decision as to whether or not a particular pseudocell has been impacted. The bounding box edge distances and polyquad edge distances are computed concurrently to determine pseudocell impact. Edge distance calculations are performed by a Dlet ASIC in a similar manner as in the case of the scan converter.

Assessing polyquad impact by reference to edge distances is described with reference to FIGS. 15 to 18. Referring to FIG. 15, a pseudocell has corners 1 to 4 and a polyquad has edges A to D. By reference to the edge equations, the following distances (d values) are calculated:

d1A, d2A, d3A, d4A
d1B, d2B, d3B, d4B
d1C, d2C, d3C, d4C
d1D, d2D, d3D, d4D

FIGS. 15, 16 and 17 show distances d1B, d2B, d3B and d4B by way of example. In FIGS. 15 and 16, all the d values are positive. In FIG. 17, d2B is negative, but d1B, d3B and d4B are positive. For all features, an equivalent set of sixteen distances are calculated by reference to the bounding box edges, that is the distance from each pseudocell corner to each bounding box edge. Thus in the example illustrated in FIG. 18, for corner number 2 of the pseudocell, the required d values correspond to the perpendicular distance from that corner to each of the four broken lines defining the bounding box.

Considering the four d values associated with one polyquad edge, that is the distances from that edge to the four pseudocell corners, then the following conditions are distinguished between and indicated by the associated outcodes:

Each of the four d values positive or zero —outcode 11
All four d values negative or some negative and some zero —outcode 01
Any other combination (else —outcode 10
The outcodes for the four edges are then combined by AND gates to produce total outcodes as follows:

| Total Outcodes | Significance |
| --- | --- |
| 11 | Feature totally covers pseudocell |
| 10 | Feature straddles (partially covers) pseudocell |
| 01 | Feature is outside pseudocell |
| 00 | Feature is outside pseudocell |

The d values from the bounding box edges to the pseudocell corners are processed in the same way as the d values for the edges of polyquads to provide outcodes 11, 01 or 10 for each bounding box edge, and total outcodes 11, 10, 01 or 00 for the combined bounding box edges. Thus two outcodes are produced, one (OCtot) for polygon edges and one (OCXtot) for bounding box edges. For light points, there are no "edges" other than the bounding box edges. Accordingly for light points total outcodes corresponding to those of the edges of polyquads are set to a default value of 10.

The two total outcodes are combined to assert either "include" (feature to be passed on for further processing) or "total cover" (feature to be passed on for further processing and feature is opaque and covers all of pseudocell). Include is asserted only if:

OCXtot=1? and
OCtot=1?
where ? is 1 or 0
Total cover is asserted only if:
The fragment is "included" and
OCtot=?1 and
OCXtOt=?1 and
the fragment is not transparent nor a light point
where again ? is 1 or 0.

Figure 19:
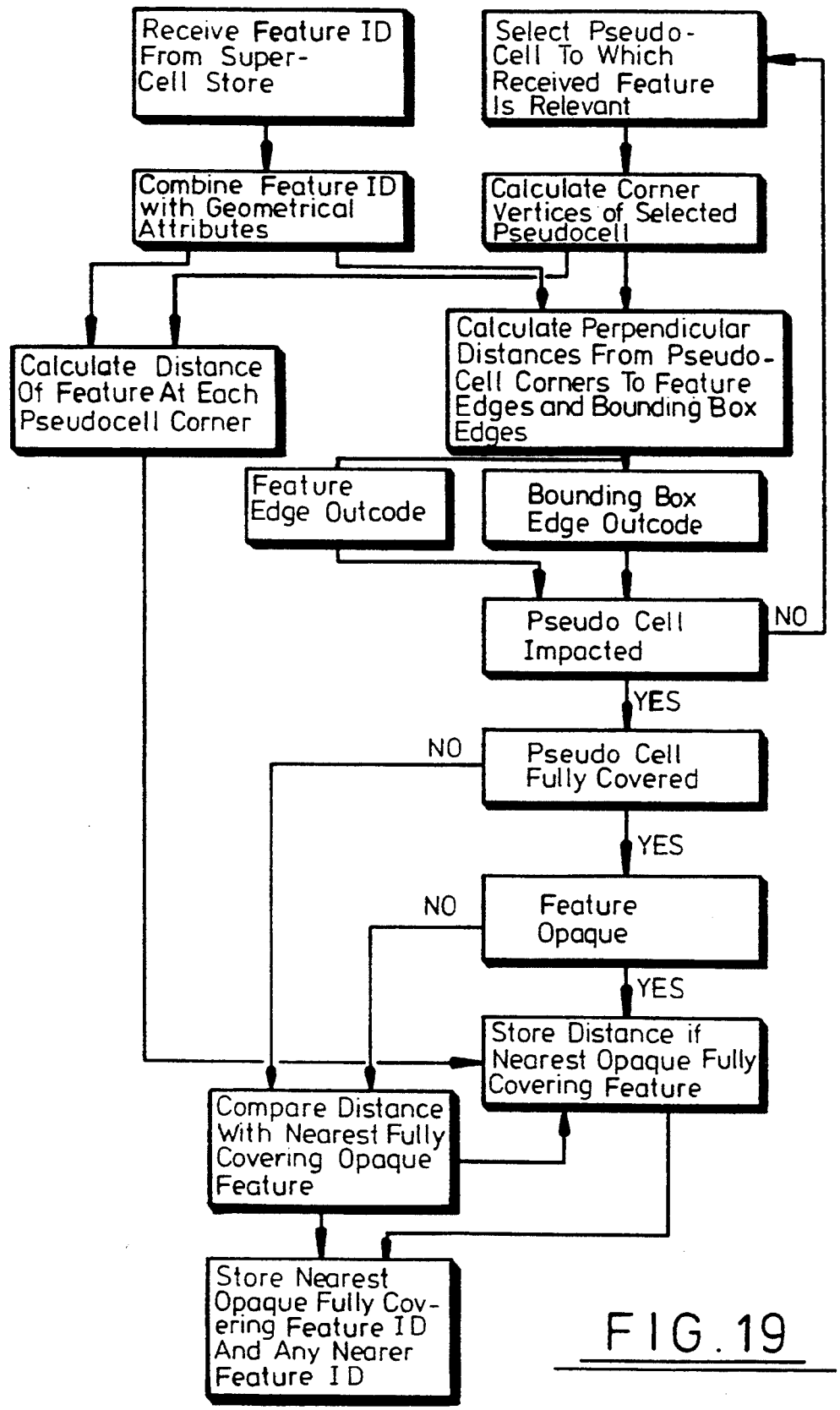
FIG. 19 is a flow diagram illustrating the processing of edge equations in the presorter.

FIG. 19 is a schematic flow diagram of the operation of the presorter. As mentioned above, in addition to analyzing pseudocell impact, the presorter also performs initial culling of feature fragments (i.e. discards those fragments that are definitely behind a totally opaque feature). For each pseudocell corner, the presorter calculates the depth of the feature then being processed. This requires an inverse perspective transformation which can be performed by a standardized ASIC as described below. The same ASIC is used throughout the system for inverse perspective transformations. The presorter receives as part of the feature attributes the polygon plane equation coefficients calculated as described above in the TE. These are used to calculate inverse Z (the inverse of the eyepoint space Z coordinate of the point on the feature plane intersected by a line drawn from the eyepoint through the relevant pseudocell corner) at each pseudocell corner.

Thus four Z depths are computed for each feature, one depth for each pseudocell corner. Each of these four Z depths is then compared simultaneously with the respective one of the four Z depths of the nearest (to the eyepoint) previously processed fully covering opaque feature. If all the Z depths of the feature being processed are greater than those of the nearest fully covering opaque feature with which they are compared, then the feature being processed is culled. If all the Z depths of the feature being processed are less than those of the nearest fully covering feature with which they are compared, and the feature being processed is opaque, then the feature being processed replaces the previously processed fully covering opaque feature.

FIG. 20 illustrates the depth sorting of features in the presorter. The viewing direction is indicated by arrow 57. Broken lines 58 and 59 indicate top and bottom boundaries of a pseudocell. Lines 60 to 66 indicate features lying in planes perpendicular to the illustration. Feature 60 is not opaque, whereas features 61 to 66 are opaque. Feature 62 is the nearest fully covering opaque feature, but its Z value at line 58 is greater than that of the projection of feature 64 to line 58, and thus feature 64 is not culled. The Z value of feature 62 at line 59 is greater than that of the projection of feature 65, and thus feature 65 is not culled. Features 63 and 66 are culled.

Figure 21:
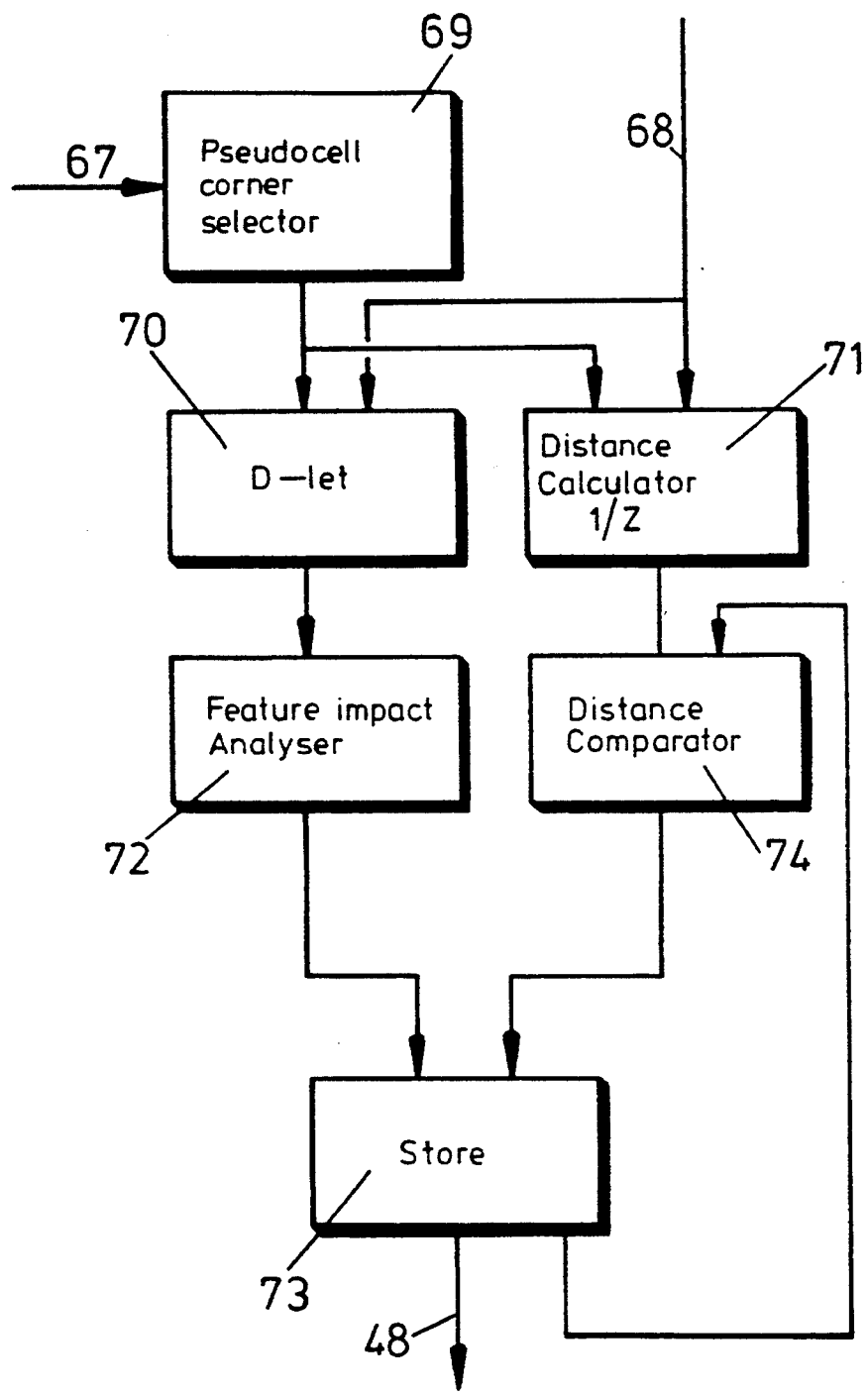
FIG. 21 is a schematic illustration of the structure of a presorter processor.

FIG. 21 schematically illustrates the presorter processor. Referring to FIG. 21, the presorter receives a series of impacting feature lists on input 67, each list corresponding to a respective supercell. The attribute data is also received on input 68 from the attribute store. The four corners (in screen space) of each pseudocell are determined by a selector 69. As described above, each pseudocell will correspond in area to sixteen pixels plus a half pixel wide border. In an ideal situation the basic cell would be square or rectangular, but distortion effects inherent in many display systems make the possibility of non-standard cell shapes highly desirable so that cells can be shaped so as to cancel out such effects. Thus a selected pseudocell might have four different x coordinates and four different y coordinates for its four corners. Selection of pseudocell corners to overcome display system non-linearities is described in more detail below.

The output of the selector 69 is applied to a Dlet 70 of the type described above and a distance calculator 71 which calculates the inverse distance (1/Z) of the four points on the plane of each feature corresponding to the corners of the pseudocell. For this calculation, it is assumed that the feature's plane covers all of the pseudocell. As described above, the Dlets perform thirty-two calculations for polyquad features, that is in respect of each corner of the pseudocell, the perpendicular distance from the corner to each edge of the feature, and the perpendicular distance from that corner to each edge of the feature's bounding box. For light points, only sixteen distances (to the bounding box edges) are calculated.

An analyzer 72 decides whether or not a feature impacts the respective pseudocell as described above. If a feature impacts the pseudocell, its ID is loaded into a store 73 with its distance from the eyepoint at each pseudocell corner. A comparator 74 compares these distances with those of previously stored features and hidden features are culled from the store 73.

After each pseudocell is processed, the selected IDs are then output onto the fragment bus 48 (FIG. 14). The fragment bus carries the coordinates (in screen space) of the pseudocell corners and the feature IDs relevant to that pseudocell. From the pseudocell corner coordinates the corners of the sixteen pseudopixels making up the pseudocell are derived by bilinear interpolation.

Load Balancing

If only one processor of the type illustrated in FIG. 21 is provided, the sixteen pseudocells are simply processed one at a time. To increase system throughput however it is advantageous to provide more than one pseudocell processor, for example four. If four pseudocell processors are provided, each can be responsible for a respective group of four pseudocells, a complete supercell being processed in four cycles of the presorter.

It may be that any one row or column of pseudopixels covers a "busy" part of the scene, for example the horizon where the density of features is often higher than for other areas of the screen. Assuming for illustrative purposes that four presorter processors are provided, then if each processor was allocated a row of four pseudocells, one processor might be overloaded as compared with the others if that processor was handling a busier part of the image than the others. This problem can be overcome however if each presorter processor is allocated pseudocells distributed across the respective supercell. FIG. 22 illustrates one such distribution, the four by four grid representing one supercell, and the sixteen sub-areas within that grid each representing a respective pseudocell. Load balancing can be achieved simply by allocating the pseudocells labelled by number one to a first processor, the pseudocells labelled by number two to a second processor, and so on. This simple distribution of presorter processing tasks greatly reduces the probability of any one processor being overloaded, and thus achieves in an easily implemented manner load balancing within the presorter. If only two processors were provided, load balancing could be achieved by processing immediately adjacent pseudocells in any row or column of pseudocells in different processors.

Sampling Point Distribution

FIG. 23 illustrates the distribution of thirty-two sampling points relative to a single pixel of the final rendered image. In FIG. 23, the square outline indicated by broken line 75 represents a single pseudocell boundary. The square broken line 76 represents the perimeter of an area enclosing thirty-two sampling points, samples from each of those thirty-two sampling points being relevant to the final RGB value allocated to the pixel positioned centrally within the area outlined by broken line 76. One edge of the pixel is indicated by numeral 77. The dots within the area enclosed within line 76 represent individual sampling points. The positions of these sampling points relative to the pseudocell boundaries are fixed for each frame but may be altered (dithered) from one frame to the next if stochastic sampling is required. It will be seen that there are eight sampling points within the perimeter of the pixel in question, four sampling points in each of the abutting half pixel areas, and two sampling points in each of the abutting quarter pixel areas. The number of sampling points per pixel will of course be selected to suit the particular performance requirements of the system. Increasing the number of sampling points will increase the quality of the final image.

The Special Effects Module

Figure 24:
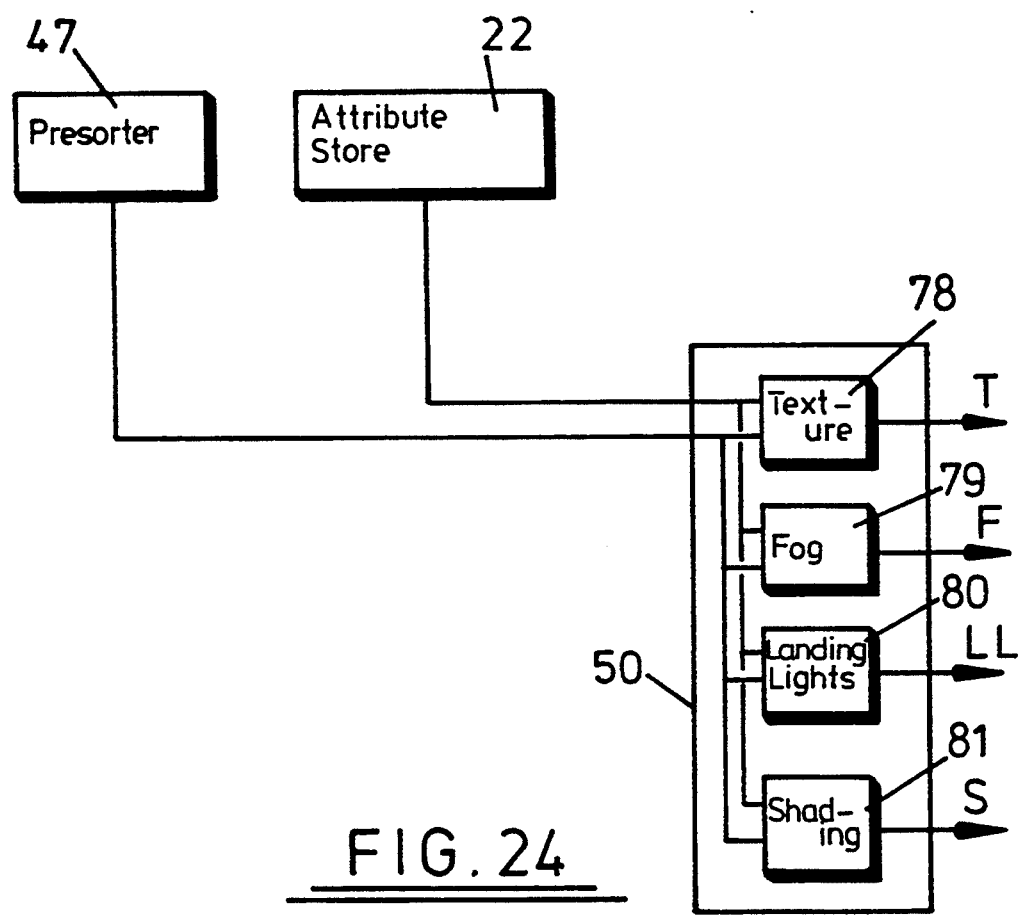
FIG. 24 is a simple illustration of the structure of the special effects module of FIG. 14.

The special effects module 50 (FIG. 14) is illustrated schematically in FIG. 24. It receives fragment data from the presorter 47 and attribute data from the attribute store 22. The module 50 is made up from a series of subsystems 78 to 81 each handling one special effect. In the illustrated case, subsystem 78 processes texture effects, subsystem 79 fog, subsystem 80 landing lights and subsystem 81 shading. Of course, provision may be made for other special effects. Each of the subsystems produces a respective output (T, F, LL, S) for each pseudopixel of the pseudocell being processed. Pseudocells are processed one at a time as they come in on the fragment bus from the presorter.

Taking as an example the texture subsystem, conventional texture techniques may be used to generate texture outputs T in respect of each pseudopixel. Essentially such techniques involve projecting the pseudopixel into "texture" space defined for each modelled feature to which texture is to be applied, calculating texture space coordinates for each projected pseudopixel, reading from a texture map the texture corresponding to the calculated texture space coordinates, and outputting the result. The detailed approach adopted to the calculation of the texture output T or the other special effects outputs is not germane to the present invention however and therefore is not described further herein. It is simply necessary to appreciate that outputs, T, F, LL and S are produced for each pseudopixel to which those effects are to be applied.

The Color Mixer

Figure 25:
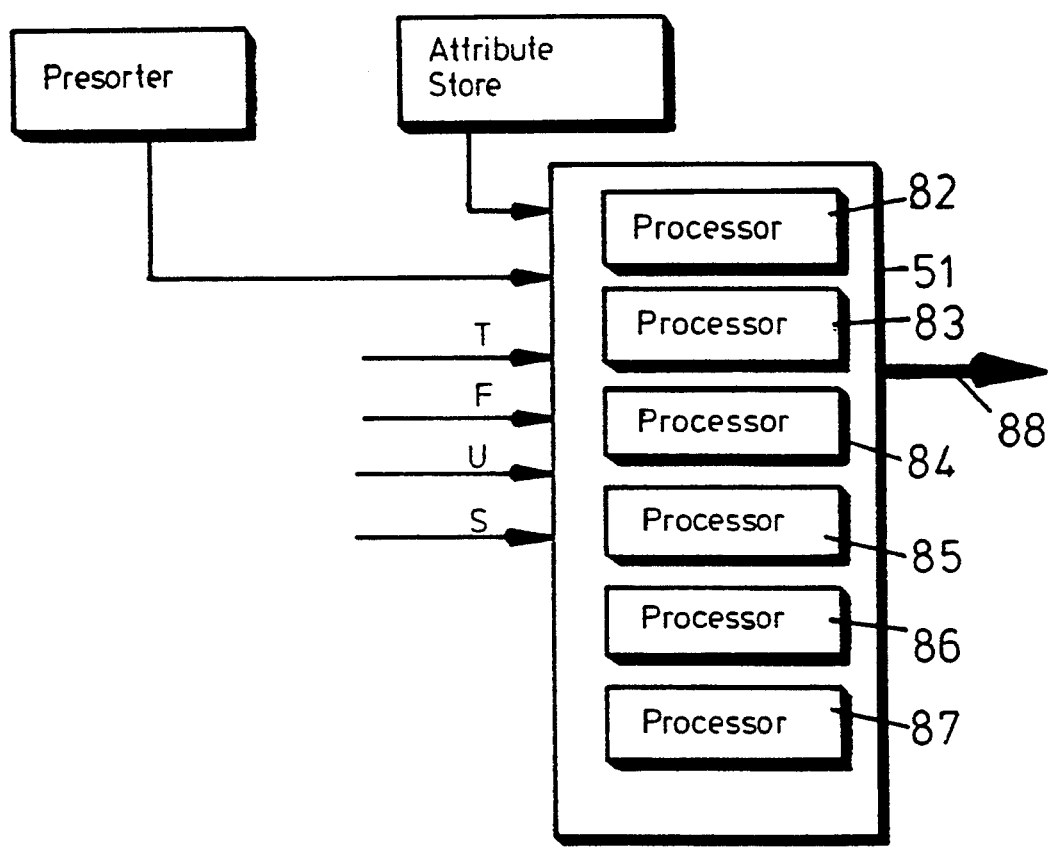
FIG. 25 is a simplified illustration of the structure of the color mixer of FIG. 14.

The color mixer 51 (FIG. 14) is illustrated in FIG. 25. The color mixer receives fragment data from the presorter 48, attribute data from the attribute store 22, and the outputs T, F, LL, S of the special effects module. Within the color mixer are subsystems that combine the various inputs to achieve desired effects. These subsystems may comprise an array of processors 82 to 87 each allocated a particular task. The detailed relationship between the various subsystems and the inputs to the color mixer is not germane to the present invention. It is simply necessary to appreciate that the color mixer provides an output 88 which includes an RGBT value for each pseudopixel of the pseudocell being processed. The output 88 is delivered to the postsorter 52.

The Postsorter

Figure 27:
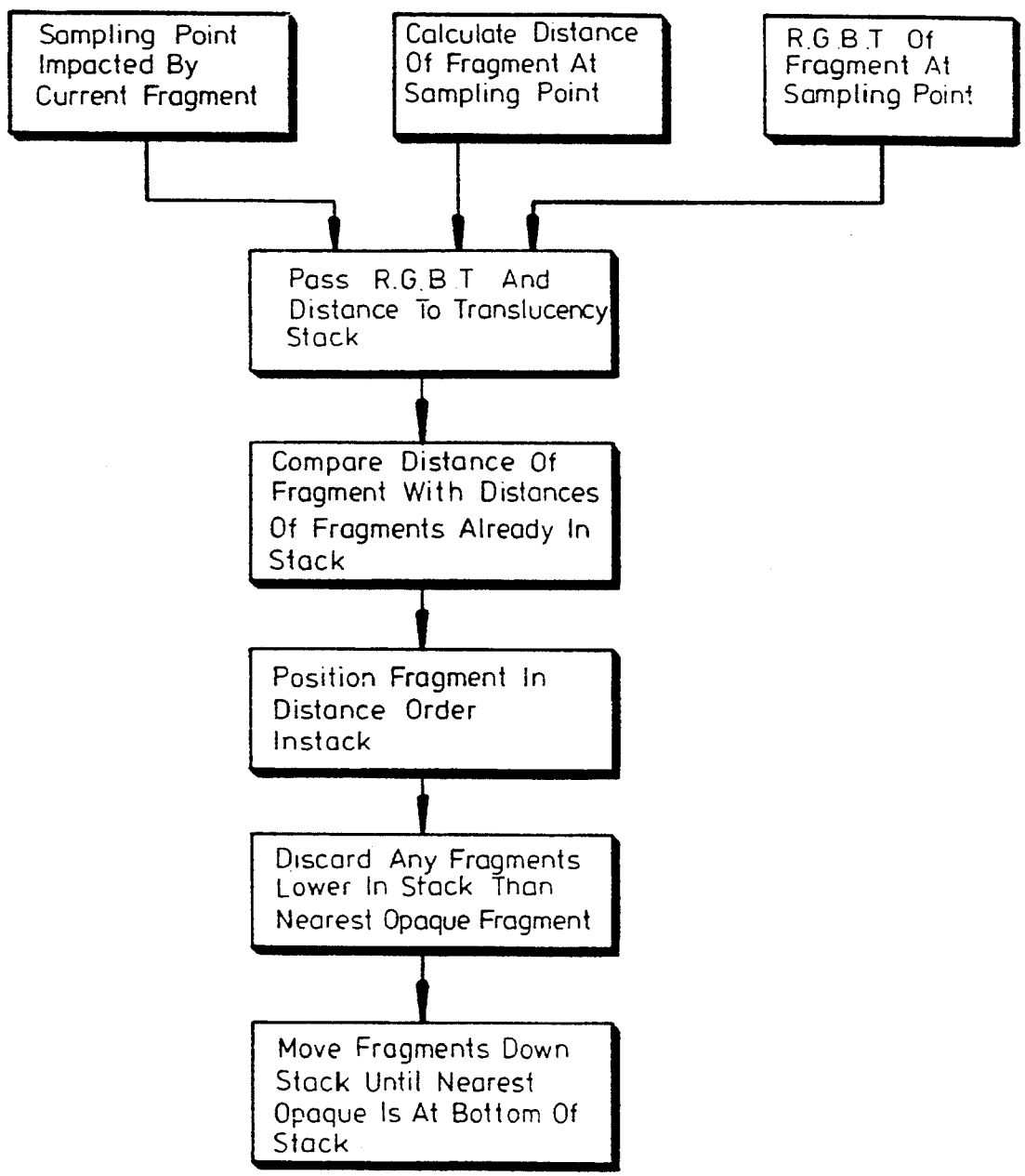
FIG. 27 is a flow diagram illustrating the operation of the postsorter.
Figure 26:
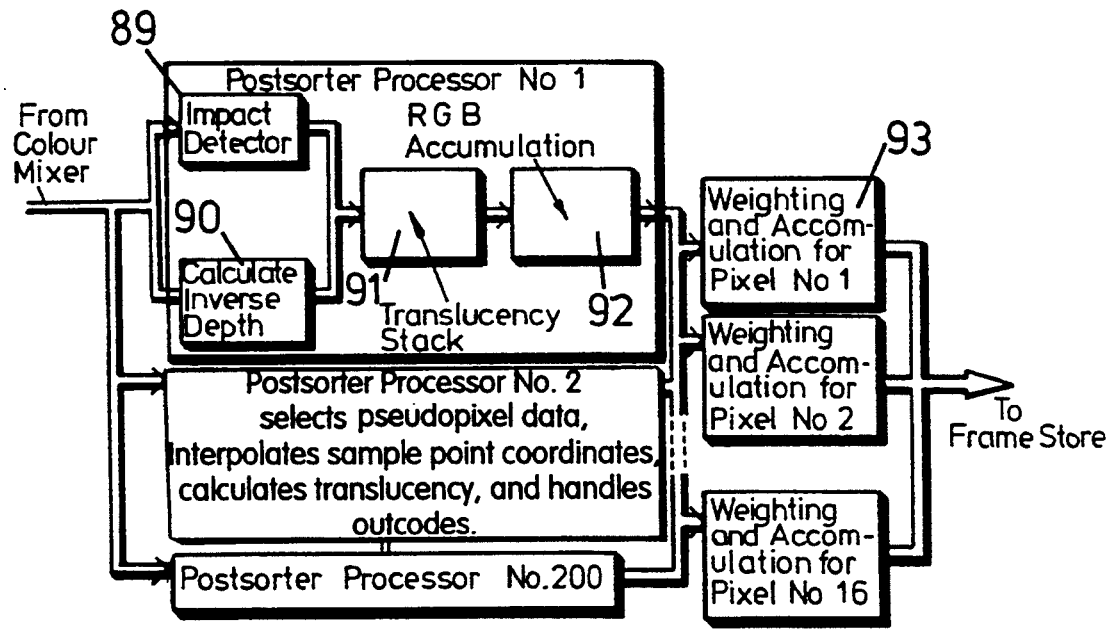
FIG. 26 is a schematic block diagram of a postsorter which receives the output of the presorter referred to above.

Referring now to FIG. 26, this schematically illustrates the structure of the postsorter. One postsorter processor is provided for each sampling point (200 per pseudocell). Each postsorter comprises a sampling point impact detector 89, an inverse Z depth calculator 90, a translucency stack 91 and an accumulator 92. The outputs of the postsorter processors are weighted and accumulated by circuits 93, one of which is provided per pixel, that is sixteen per pseudocell. The operation of the postsorter is illustrated in FIG. 27.

Each postsorter processor receives the geometrical attributes of each feature identified as impacting the relevant pseudocell, plus the RGBT value produced by the color mixer for the pseudopixel within which the sampling point is positioned. The appropriate pseudopixel data is selected for each sampling point by reference to the position of the sampling point relative to the pseudocell. Completely transparent samples are discarded so as to avoid cluttering the translucency stacks.

For each pseudocell, sixteen RGBT values for the sixteen pseudopixels covering that pseudocell are input into the postsorter from the color mixer. Each postsorter processor is arranged to receive four pseudopixel values for the quadrant containing the sampling point, one quadrant being a quarter of a pseudocell, that is 2×2 pseudopixels. However, each processor is programmed to ignore all but the single RGBT value for the pseudopixel containing that processor's sampling point. Each pseudopixel area contains either 12 or 13 sampling points, each quadrant area containing 50 sampling points, and each abutting pair of pseudopixels containing 25 sampling points.

Sampling Point Impact Assessment

Polyquads

Figure 28:
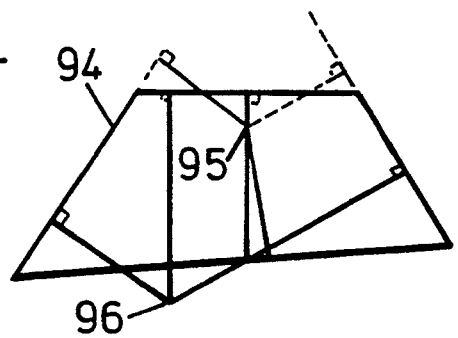
FIG. 28 illustrates the wax in which the impact of a polygon on a sampling point is assessed.

In the case of polyquads, the impact detector relies upon the line equations of the feature being processed to decide whether or not the sampling point is impacted. FIG. 28 illustrates a polyquad 94 and two sampling points 95 and 96 which are respectively impacted and not impacted by the polyquad 94. Once again, the line equations defining the edges of the polygon are used by Dlet ASICs to determine the perpendicular distances from the corners of the pseudocell to each edge. The processor then uses bilinear interpolation to find the distances from the four edges to its own sampling point. For each sampling point, four distances are output. If all four are positive or zero, impact has occurred. If any one is negative, there is no impact.

Ambiguity can arise in the event of a boundary between two feature edges passing exactly through the sampling point (distance equals zero). If both features are deemed to impact the sampling point, overlap results. If neither feature is deemed to impact the sampling point, a "hole" results. The problem can be overcome if one of the two feature edges is flagged to indicate that it "owns" the common edge, that is to say it alone impacts the sampling point. One approach to the production of such a flag would be to identify any edge which passes exactly through a sampling point (perpendicular distance equals zero) and to inhibit for that sampling point any further feature which satisfied the same criteria. Similar problems can arise with feature vertices impacting a sampling point. Again the problem can be solved by inhibiting second and subsequent polygons impacting a sampling point.

Light points

Figure 29:
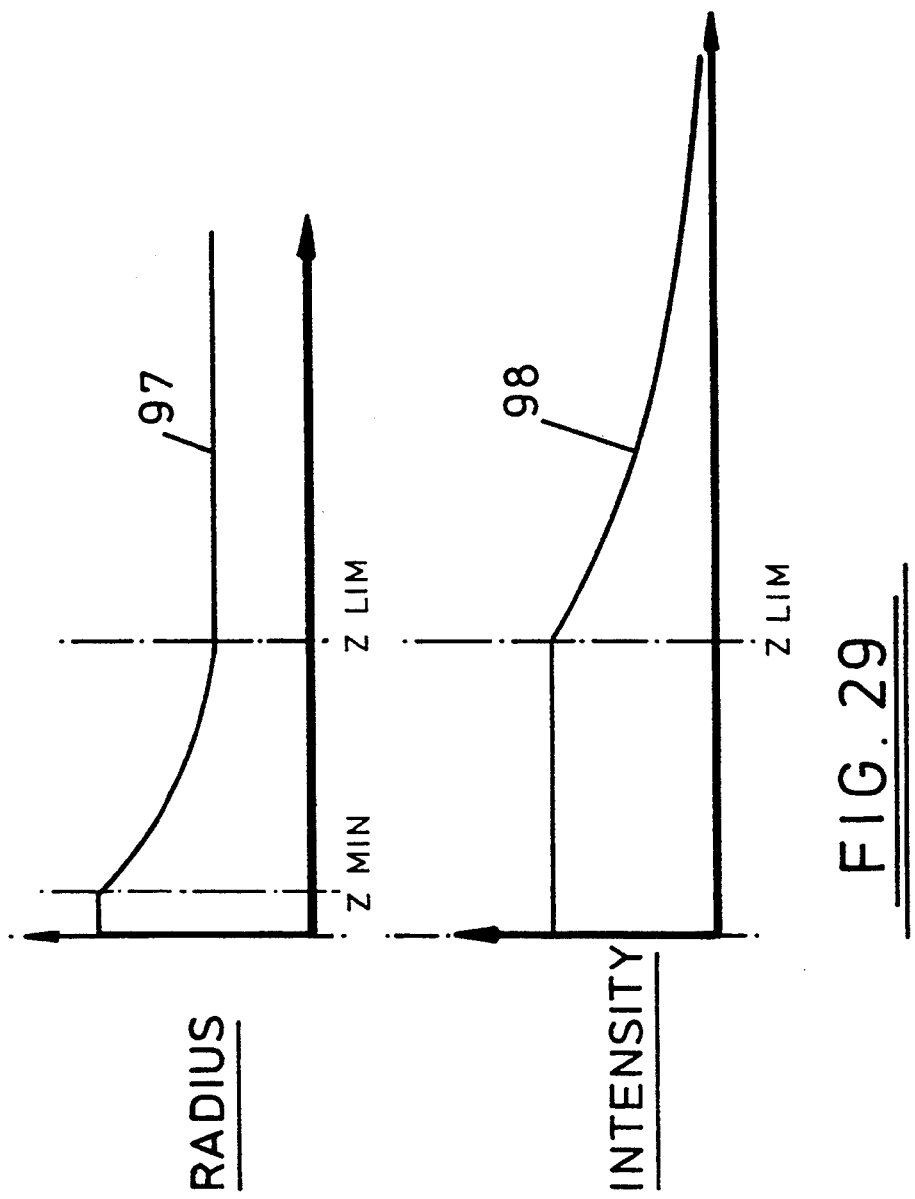
FIG. 29 illustrates the relationship between the distance of a light point from the eyepoint and light point size and intensity.

In the case of light points, both RLPs and CLPs, impact assessment is relatively simple, and is described below for light points which are circles in screen space, the screen space coordinates of the center of the light point circle and the light point radius being calculated in the TE (FIG. 1). Light point radius and intrinsic intensity calculation is described with reference to FIG. 29. In FIG. 29, the full line 97 indicates the variation of radius with Z in eyepoint coordinates. For Z less than a first limiting distance $Z_{MIN}$, the lightpoint radius is clamped to a maximum radius. The maximum radius of calligraphic light points must be limited to prevent them becoming larger than the maximum size capability of the calligraphic light point projector, and the maximum radius of raster light points must be limited to prevent them occupying an unrealistically large area in screen space. For Z greater than a second predetermined limiting distance $Z_{LIM}$, the radius is clamped to a minimum radius to prevent uncontrolled "twinkling" or scintillation between frames which would occur if the light point became too small. Of course, scintillation could be deliberately introduced if desired, but this would be achieved by varying the intrinsic intensity of a light point between consecutive frames. For light points at a distance between $Z_{MIN}$ and $Z_{LIM}$, the radius is reduced with Z as a function of for example Z squared.

The intrinsic intensity may also be adjusted in dependence upon Z as indicated by the line 98. Thus the intensity is held constant for Z less than $Z_{LIM}$, and falls as Z increases above $Z_{LIM}$. Thus, by appropriate adjustment of both radius and intensity, realistic range effects can be simulated. The precise relationship between Z, radius and intrinsic intensity is not of fundamental importance but the example illustrated in FIG. 29 provides realistic effects.

Figure 30:
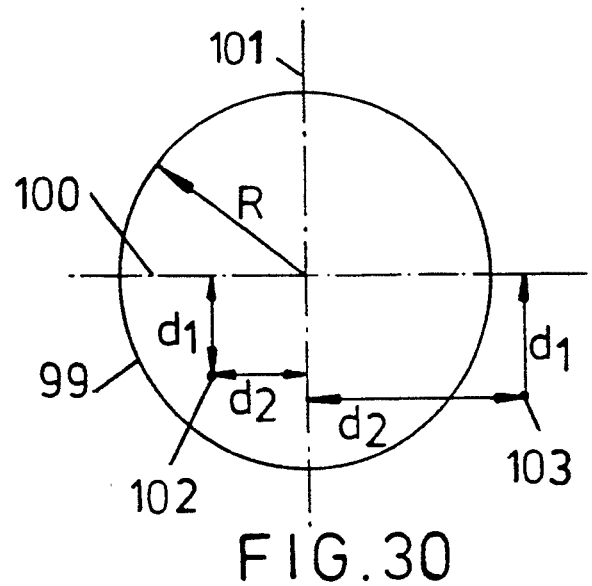
FIG. 30 illustrates the assessment of light point impact on a sampling point.

Referring now to FIG. 30, this illustrates impact assessment for light points. In FIG. 30, the boundary of a light point is indicated by circle 99. Line equations are calculated trivially for lines 100 and 101 which are parallel to the screen x and y axes respectively. These equations are:

$$y - y_c = 0$$

$$x - x_c = 0$$

where $(x_c, y_c)$ are the coordinates of the light point center. Two sampling points 102 and 103 are shown by way of example. For each sampling point the perpendicular distances d1 and d2 to the lines 100 and 101 are calculated. A sampling point is impacted if:

$$(d1)^2 + (d2)^2 <= R^2$$

Thus impact assessment for all types of feature has been described.

Inverse Depth Calculation

Figure 31:
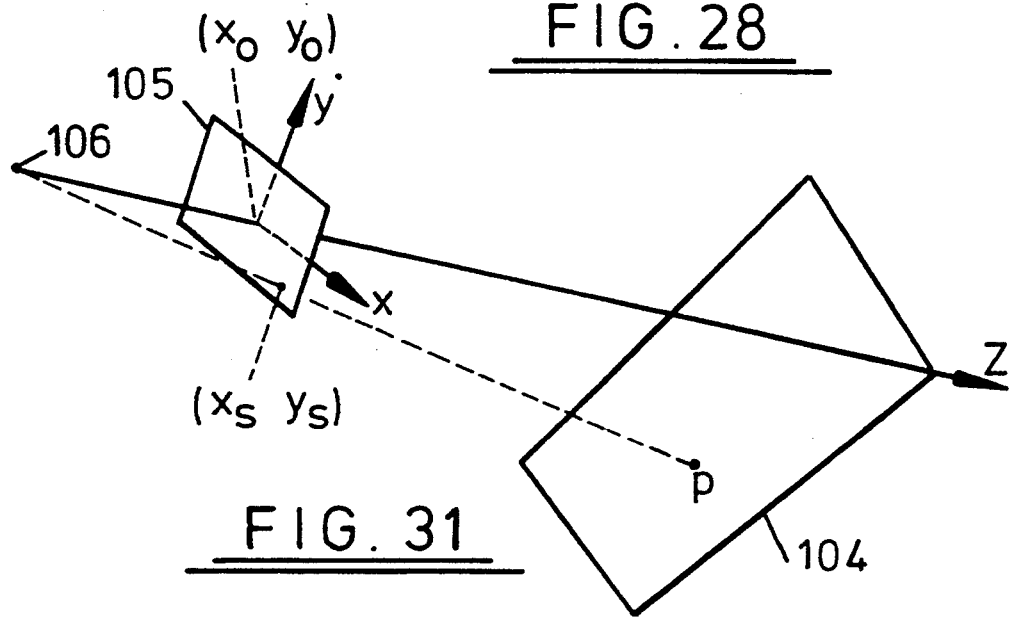
FIG. 31 illustrates the calculation of distance from the eyepoint for a point on a polygonal feature.

For each feature, the inverse depth (i/Z) of a feature impacting the sampling point is calculated by the Z depth calculator 90. FIG. 31 illustrates the basic geometry. A feature 104 is viewed through a viewing plane 105 from eyepoint 106. The plane equation of the feature is known from the received attributes, and thus the (x, y, z) coordinates in eyepoint space of any point P on the feature can be calculated from the equation:

$$z = -D/(Ax_s/d_x + By_s/d_y + C)$$

where A, B, C and D are the plane equation coefficients of the feature $d_x$ and $d_y$ are functions of the half angle of the display,
$x_s$ and $y_s$ are the screen space coordinates of a line drawn from the eyepoint to the point P, and
$x_o$ and $y_o$ are the screen space origin coordinates.

The x and y coordinates in eyepoint space can also be readily calculated from:

$$x = zx_s/d_x \quad y = zy_s/d_y$$

It should be noted that this inverse perspective transformation is the same transformation that is used throughout the system where appropriate, e.g. in the presorter for Z-depth feature sorting, and may be performed by a dedicated ASIC.

The impacting fragment inverse depth is passed to the translucency stack with the RGBT values. The stack can store for example eight entries each containing the RGBT and 1/Z for one feature fragment. When a translucent (at the particular sampling point) feature fragment is presented to the stack, its 1/Z is compared with all existing entries in the stack. Assuming no earlier entries, the first translucent feature is stored in position eight in the stack, its position being indicated by a "top of stack" pointer pointing to position eight. The next (second) translucent fragment is depth compared with that in position eight. The two fragments are stored in positions seven and eight, with the nearest fragment in position seven. The stack pointer then points to position seven. If a fragment is received which, at the sampling point, is opaque, that fragment is correctly positioned in the stack in depth order and then moved down the stack to position eight (if not already in position eight). Any entries beneath it in the stack are discarded, and any entries above it are moved down with it so that the depth order is maintained. The stack pointer keeps track of the nearest (top of the stack) fragment.

In the case of RLPs, the same procedure is used, but the number of RLP's, which can be resident at any one time is limited to for example one. Thus, the first RLP which is nearer than the current nearest opaque feature in the stack is inserted into the stack at the appropriate position. If a second RLP is received, it is either discarded (if it is further away from the eyepoint than the resident RLP) or inserted in the stack at the appropriate depth sorted position (if it is nearer to the eyepoint than the resident RLP). If the second RLP is inserted into the stack the previously resident RLP is discarded. In some implementations more than one RLP may be accepted in the stack, but generally one will be sufficient for a realistic final image given that RLP intensity is limited to the relatively low maximum intensity possible with raster projection of pixels.

In the case of CLPs, these are not entered in the stack but are processed as described below after a discussion of the further processing of features loaded into the translucency stack.

Each postsorter processor thus produces a list of fragments in depth order, with each having an associated RGB and T value. The final color contribution of each sampling point is then calculated in the accumulator 92. Assuming that there are seven translucent fragments having translucencies of T0, T1–T6, and that the seven translucent and one opaque fragments have colors R0G0B0, R1G1B1–R7G7B7, the cumulative translucency in front of the nth translucent fragment is:

$$cTn = T_0 \times T_1 \times \ldots \times T_{n-1}$$

Each final color component (R, G, B) is then calculated as follows:

$$R = cT0 \times R0 + cT1 \times R1 + \ldots cT7 \times R7$$

$$G = cT0 \times G0 + cT1 \times G1 + \ldots cT7 \times G7$$

$$B = cT0 \times B0 + cT1 \times B1 + \ldots cT7 \times B7$$

Thus, each sampling point processor produces a single RGB value and it is from a weighted summation of these values that the final pixel RGBs are formed.

For each pixel of the final image, thirty two sampling points are relevant, that is the eight sampling points within that pixel, plus the twenty four sampling points in a half pixel wide boundary around the pixel. Sampling points are allocated different weights as sampling points near to the center of the pixel should have more effect than sapling points close to the edge of the pixel boundary. Each sampling point will contribute to four different pixels and will have a different weighting for each pixel to which it contributes, the weighting being a function of the distance from the sampling point to the relevant pixel center.

Each weighting and accumulator device 93 takes the outputs from thirty two postsorter processors, applies the appropriate weightings, sums the results, and outputs the sum to the respective pixel address in the frame store. All sixteen pixels in the cell are processed concurrently by the sixteen weighting and accumulator devices, and then the data relevant to the next cell of sixteen pixels is released to the postsorter. The process is then repeated until all the cells of all the supercells have been processed. The completed frame can then be downloaded for display.

The Light Point Store

The light point store performs two functions, that is RLP translucency calculations, and CLP translucency calculations and further processing.

The translucency of light points is calculated as a function of light point intensity. The intensity of RLPs and CLPs is calculated in the light point store initially assuming no intervening features; the calculated intensity being essentially a function of range, directionality, atmospheric density etc. Translucency is calculated such that a high intensity light point has a low value of translucency, whereas a low intensity light point will have a high value of translucency. The precise relationship between intensity and translucency is not particularly important, but the relationship could be for example that at a first given intensity level or below a minimum translucency value is predetermined, and for a second given intensity level or above the light point is deemed to be opaque, the translucency varying in a non-linear manner between the two given intensity levels. The intensity is calculated from the attributes supplied to the light point store and RLP intensity is fed back to the color mixer along the path indicated between the light point store and the color mixer in FIG. 14.

Calligraphic light points

CLPs are projected after the raster scan projection of the contents of the frame store. The CLPs are superimposed on the raster image. The intensity of a CLP must take account of translucent features between that CLP and the eyepoint and thus CLPs are processed after all the features have been entered into the appropriate translucency stacks. Essentially CLPs are held back by the presorter until all other features have been processed. In addition, it is very important for final image quality that overlapping CLPs are not allowed to build up. If no anti-build-up mechanism is provided then for example runway lights viewed from one end of the runway close to the ground will appear to increase in intensity with range. This causes the far end of the runway to appear to climb up hill.

For any one sampling point, the z depth of each CLP to impact that sampling point is compared with the z depths of features in the respective stack. Calligraphic light points are modelled as strings of light points, each string being processed by one object processor, and output by that object processor in near to far from the eyepoint order. Thus each sampling point receives the nearest impacting CLP of any one string first.

At each sampling point, the attenuation of a CLP impacting that sampling point is calculated as a function of the translucency of the features identified in the translucency stack as being nearer to the eyepoint than the CLP. An "aperture" for the CLP is also calculated, the aperture being 1 or 0 for each sampling point, "1" indicating sampling point impact, "0" indicating no impact. The aperture and attenuation for each sampling point are combined in the weighting and accumulation device (component 93 in FIG. 26) and the combined attenuations and apertures for each pixel in the respective cell are output to the light point store.

The translucency of the first CLP to be received at a sampling point is stored in a veil store, one of which is associated with the translucency stack of each postsorter processor. If a second CLP impacts the same sampling point, its attenuation is calculated as for the first, but also taking into account the nearer CLP already stored in the veil store. The calculated attenuation and aperture are combined with those of the other impacted sampling points and output to the light point store as before. The translucency of the first CLP (stored in the veil store) is then multiplied by the translucency of the second CLP to form a combined translucency, which is then written as a new value to the relevant veil store. Thus the veil store stores an accumulated translucency for all CLPs impacting the respective sampling point, which thus accounts for the effect of one CLP effectively obscuring a more distant CLP. The prerequisite for this is that all CLPs for which anti-build-up is required have to be presented to the postsorter in near to far order. For some effects, e.g. simulation of very high intensity light sources, build-up of CLPs may be desirable. This can be achieved simply by disabling the anti-build-up mechanism for the CLPs in question.

The projection techniques for CLPs mean that any CLP is projected as a circular spot with a Gaussian intensity distribution. Intensity modulation within one CLP is not possible. Therefore the intensity of the CPL must be calculated as a function of its accumulated aperture and attenuation.

The accumulated aperture is the number of sampling points in the respective cell that are potentially impacted by the CLP. The accumulated attenuation represents an attenuation factor which is a measure of the visible portion of the CLP within that cell after occulting (by nearer opaque features) and attenuation (by nearer translucent features) have been taken into account. For example, if a CLP is computed to fall totally within one cell, and its size is computed such as to cover twenty sampling points in the respective cell, its aperture is 20. If there is one nearer opaque feature that obscures ten of those sampling points, the attenuation factor is computed to be 10. As another example, if there is one nearer translucent feature that covers ten of those twenty sampling points and has a translucency value of 0.5, the attenuation factor is computed to 15. In the first case, the final intensity of the CLP is modified by a factor of 0.5 (attenuation factor (10) divided by aperture (20)). In the second case, the final intensity of the CLP is modified by a factor of 0.75 (attenuation factor (15) divided by aperture (20)).

Since CLPs can overlap more than one adjacent cell, the final calculation of intensity must be deferred until all cells covered by the CLP have been processed by the postsorter. The final intensity is given by summing the aperture contributions from all the overlapped cells, summing the attenuation contributions from all the overlapped cells, and forming the quotient of the two generated sums.

Figure 32:
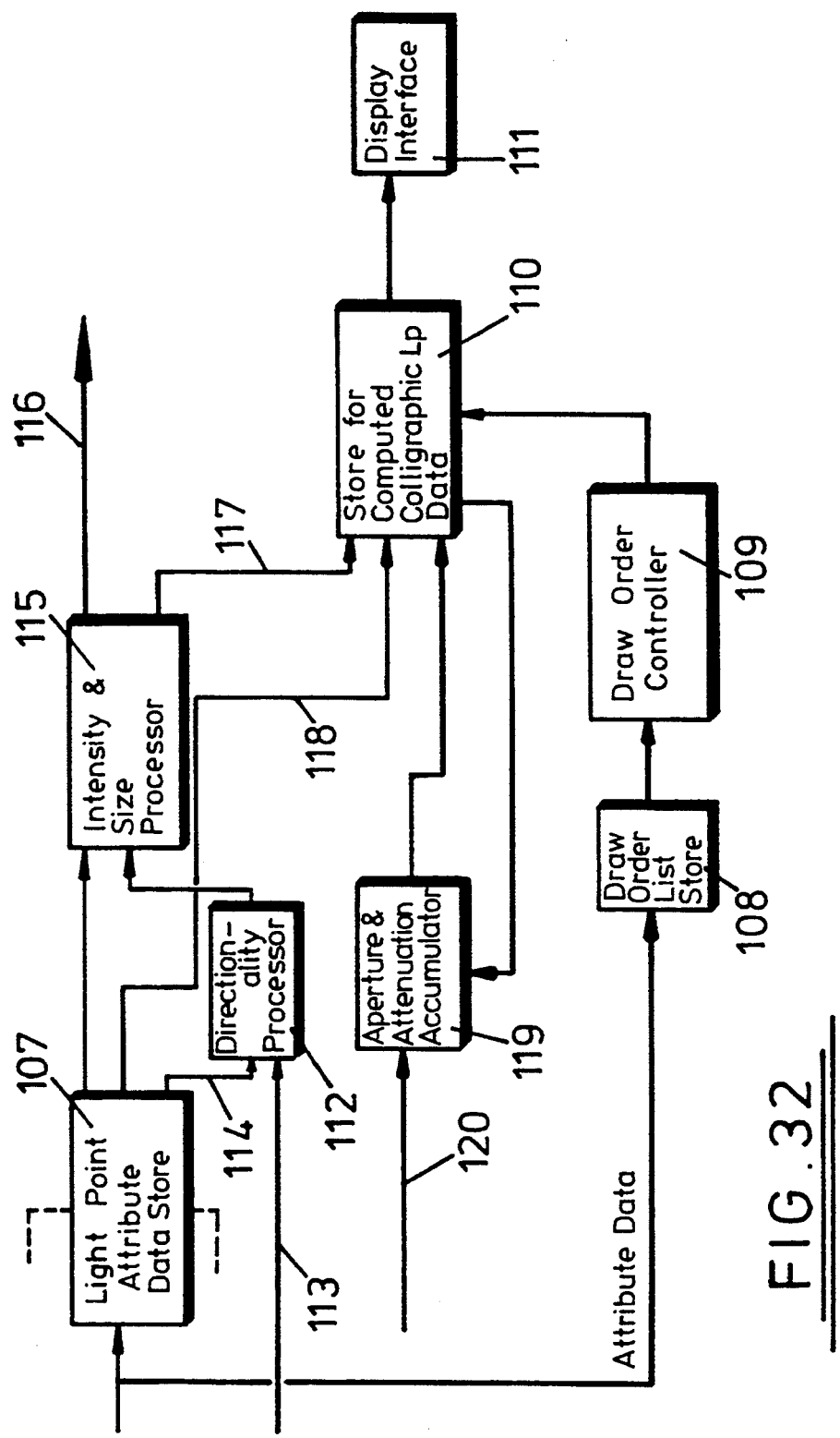
FIG. 32 illustrates the structure of the light point store referred to briefly with reference to FIG. 14.

FIG. 32 is a schematic illustration of the light point store. Light point attribute data is received from the object processors and stored in an attribute store 107. A CLP draw order list for each string of CLPs is also received from the object processors and stored in a draw order list store 108. The stored lists are used by a draw order controller 109 to address a CLP store 110 so that a CLP display interface 111 receives CLP display data in an appropriate order.

A directionality processor 112 receives an eye direction vector on output 113 from the object processors, and a CLP direction vector or input 114. The directionality processor 112 outputs an intensity appropriate to its input to an intensity and size processor 115. The processor 115 produces on output 116 an opacity value for the light point (RLP or CLP) which is returned to the color mixer. The processor 115 also produces an output 117 indicative of CLP size and intensity.

The store 110 receives position and color attributes on input 118 from the attribute store 107 and the input 117. An aperture and attenuation accumulator 119 receives aperture and attenuation data from the postsorter on input 120 and provides an accumulated aperture and attenuation output to the store 110. The store 110 provides an input to the accumulator 119 to enable accumulation of aperture and attenuation data from adjacent cells overlapped by the same CLP. Thus the store accumulates the final CLP display data for output to the display interface 111 under the control of the draw order controller 109.

Non-linear Mapping

One often encountered problem in image generators is non-linear mapping. When projecting an image onto a non-planar display screen, such as a back projection screen viewed through a spheroidal mirror, non-linearities occur due to for example off-axis location of projectors. As a result the displayed pixels are not rectangular nor are they of the same shape or size. Correction is required if the displayed image is not to appear distorted.

In the system described above, the display screen is divided into square pseudocells each made up from a regular array of square pixels all of equal size. The impact of features on pseudocells is determined by reference to the pseudocell corners and the impact of features on sampling points is determined by reference to the position of the sampling points relative to the pseudocell boundaries. This general structure makes it possible to correct for non-linear mapping simply by setting the pseudocell boundaries to correspond to the distorted raster scan which results from imperfections in the visual system.

Figure 33:
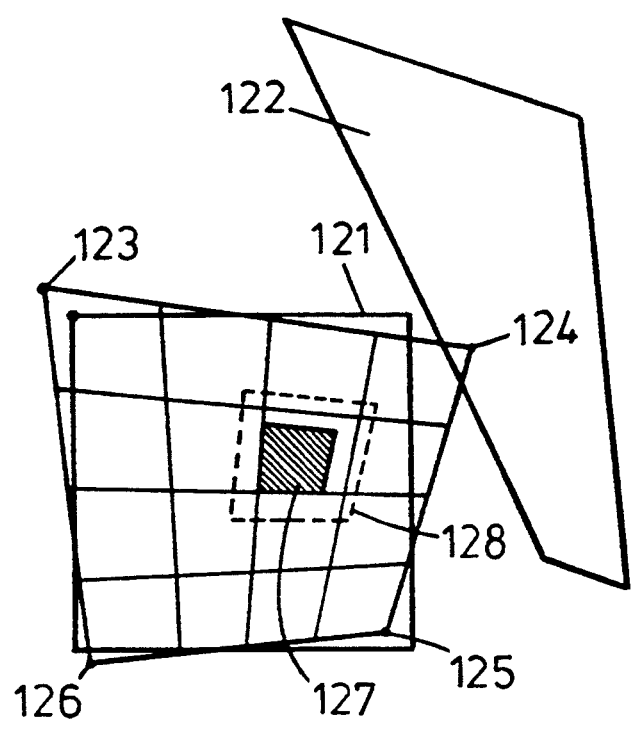
FIG. 33 illustrates techniques used to overcome the effects of distortion in a display device.

In more detail, in the presorter feature impact is decided by calculating the distance of each corner of a pseudocell from the edges of the feature. Referring to FIG. 33, the square pseudocell 121 is not impacted by polygon 122 and thus polygon 122 would be discarded from consideration for pseudocell 121. If however the optical system used to display the information corresponding to pseudocell 121 distorts the area of the pseudocell so that its distorted corners are as indicated by numerals 123 to 126, it will be seen that corner 124 extends into the polygon 122. Thus polygon 122 must be included in the feature list associated with the pseudocell.

This is simply achieved by using distorted pseudocells the corners of which correspond to the true position of pseudocell corners when projected. Thus, assuming a cell has four corners $(x_0y_0)$, $(x_1y_1)$, $(x_2y_2)$, $(x_3y_3)$ in the case of a square cell $x_0=x_2$, $y_o=y_2$, $y_2=y_3$ and $x_0=x_3$. In contrast, in a distorted cell no two coordinate values need to be the same. Thus although nominally the display screen is broken up into a rectilinear array of pseudocells the pseudocell corners are distorted to take account of distortions in the optical projection system. All calculations in the presorter remain valid whether one is concerned with a rectilinear or distorted pseudocell. Pseudopixel boundaries can be easily derived, e.g. by interpolation from the corner coordinates, In the described implementation, the four edges of each distorted pseudocell are straight. In the case illustrated in FIG. 33, the corner 124 of the pseudocell would be identified as lying within polygon 122, and the ID of polygon 122 would be passed forward as relevant to that pseudocell. Impact determination is on the basis of the same equations as described above for square pseudocells. Within the special effects module, the pseudopixels are processed as described above, the pseudopixel corners being derived from the pseudocell corners by interpolation. Thus the input to the postsorter is, as with a non-distorted pseudocell array, a series of feature IDs each accompanied by sixteen pseudopixel RGBT values.

The sampling points and pixel boundaries are fixed in position by interpolation relative to the pseudocell corners, that is to the same coordinate system as the pseudopixels. Thus, each group of thirty two sampling points relevant to one pixel is known. FIG. 33 shows one pixel indicated by shaded area 127 and having a half pixel wide boundary shown by line 128. It will be seen that as the pseudopixel and pixel boundaries are interpolated from the pseudocell corners the pixel is itself not square. The distribution of sampling points matches the distortion of the associated pixel. Thus, the RGB loaded into the frame store in respect of the pixel which when projected covers shaded area 127 corresponds exactly to the image information appropriate to the area 122.

In the system described above the scan converter performs an initial feature sorting process to define lists of features relevant to supercells. If pseudocells are distorted to handle projector distortion, steps should be taken to ensure that the supercell stacks identify all features relevant to the respective pseudocell group. This can be achieved for example by designing the scan converter to work in distorted space, or combining supercell lists where the position of a pseudocell indicates that a distorted pseudocell will overlap the combination of those supercells.

The non-linear mapping approach outlined above ensures that the display is not geometrically compromised in any way. Straight polygon edges are smoothly distorted with no discontinuities at cell boundaries. There are no piecewise approximations at cell boundaries. Furthermore it is not necessary to recompute polygon line equations, or break up features to "fit" distorted pixels. Effects such as texture and fog are similarly distorted. Thus the full capacity of the system is available to process feature data downloaded from the model database. Finally, the non-linear mapping may be dynamic (varying pseudocell corners) when a projector exit pupil may move relative to the display screen and eyepoint. This is the case in some projection systems, for example "area of interest" displays where a projector is "steered" in the direction in which a pilot is looking.

We claim:

1. An apparatus for generating an image to be displayed on a display screen from data defining a model including a plurality of opaque and translucent features, the image being intended to represent a view of the model from a predetermined eyepoint and being made up from an angry of screen space pixels to be displayed by a raster scanning process, each pixel being of uniform color and intensity, and the pixels together defining an image area, comprising:
 a. dividing means for dividing the image area into an array of sub-areas each of which covers at least one pixel,
 b. sub-area coverage determining means for determining for each feature in the model which of the sub-areas is at least partially covered by that feature,
 c. list means for producing a list of feature identifiers in respect of each sub-area, the list for any one sub-area identifying features which at least partially cover that sub-area,
 d. position means for determining a position in screen space for at least one sampling point within each sub-area,
 e. sampling point cover determining means for determining, for each sub-area in turn, and for each said sampling point, which of the features in that sub-area's list cover that sampling point,
 f. distance determining means for determining, for each feature which covers a sampling point, a distance from the eyepoint to that feature at the sampling point,
 g. feature storing means for storing feature describing data for each sampling point within a sub-area, the stored dam being indicative of at least the distance of the opaque feature which covers the sampling point and is nearest to the eyepoint and the distance and translucency of at least one nearer translucent feature which covers the sampling point,
 h. sampling point output means for producing an output for each sampling point within a sub-area, the sampling point output corresponding to the combined effects of the features identified by the data stored in the data storing means,
 i. pixel producing output means for producing an output for each pixel within a sub-area, the pixel output corresponding to the combined effects of the sampling point outputs for all sampling points which contribute to that pixel, and
 j. display means for displaying the pixel outputs.

2. An apparatus according to claim 1, wherein each sub-area covers a plurality of pixels.

3. An apparatus according to claim 1, comprising a plurality of parallel sampling point processors each including a said sampling point cover determining means, a said distance determining means, a said storing means and a said sampling point output producing means.

4. An apparatus according to claim 3, comprising one sampling point processor for each sampling point within a sub-area 5. An apparatus according to claim 1, comprising a plurality of parallel pixel processors each including a said pixel producing output means.

6. An apparatus according to claim 5, comprising one pixel processor for each pixel within a sub-area.

7. An apparatus according to claim 1, wherein the pixel producing output means receives inputs relative to each pixel from each sampling point lying within the pixel and each sampling point lying within a predetermined area extending around the pixel.

8. An apparatus according to claim 7, wherein the predetermined area is a half pixel wide strip extending around the pixel.

9. An apparatus according to claim 1, wherein the sampling point cover determining means comprises, relative to each sampling point, means for calculating a perpendicular distance for a sampling point from edges of any polygonal feature that at least partially covers a respective sub-area, and means for logically combining the calculated perpendicular distances to determine whether the sampling point is within the polygon.

10. An apparatus according to claim 9, wherein each polygon edge is defined by an edge equation in said model, the coefficients of the edge equations being selected such that the polygon edges form a closed string of connected vectors all running in the same direction around the polygon, the calculating a perpendicular distance means produces an output relative to each edge equation, the sign of said output indicates the side of the edge on which the sampling point is positioned, and the logical combining means comprises means for indicating whether the sampling point is within the polygon by reference to the signs of the distances to the polygon edges.

11. An apparatus according to claim 10, wherein the polygon is convex and its edges form a closed string of connected vectors all running in the clockwise direction around the polygon, the calculating a perpendicular distance means produces a negative output in respect of any one edge equation if the sampling point is to the left hand side of the polygon edge represented by that edge equation, and the logical combining means produces an output indicating that the sampling point is not covered if any one output of the distance calculating means is negative.

12. An apparatus according to claim 1, wherein the sampling point cover determining means comprises, relative to each sampling point, means for calculating a perpendicular distance for a sampling point from major and minor axes of any screen space ellipse feature that at least partially covers a respective sub-area, and means for substituting the calculated distances in a screen equation of the ellipse to determine whether the sampling point is covered by the ellipse feature.

13. An apparatus according to claim 1, wherein the distance determining means comprises means for performing an inverse perspective transformation to calculate from screen space coordinates of the respective sampling point at least one eyepoint space coordinate of a point on the feature which lies on a line drawn from the eyepoint through the sampling point.

14. An apparatus according to claim 13, wherein the said eyepoint space coordinate is the Z coordinate where the Z axis of eyepoint space extends from the eyepoint through a center of the display screen.

15. An apparatus according to claim 1, wherein the feature storing means comprises a translucency stack memory, means for comparing a distance from the eyepoint at the sampling point of each feature received with distances from the eyepoint of any features previously received by the feature storing means, and means for storing each received feature in the stack in a position in the stack such that the features are stored in an order corresponding to the distance from the eyepoint.

16. An apparatus according to claim 15, comprising means for positioning coplanar features in the stack in accordance with feature attribute data defining the relative visibility of coplanar features.

17. An apparatus according to claim 15, wherein the storing means comprises means for storing data identifying the first received opaque feature at the last position in the stack, and means for replacing the data identifying the first received opaque feature with data identifying a subsequently received opaque feature if the subsequently received opaque feature is nearer to the eyepoint than the feature previously stored in the last position in the stack.

18. An apparatus according to claim 17, wherein the storing means comprises means for storing data identifying translucent features in the stack at positions which are sorted in distance from the eyepoint order, translucent features which are further from the eyepoint than any opaque feature identified by data stored in the last position in the stack being discarded.

19. An apparatus according to claim 15, wherein features representing raster light points to be included in the raster pixels of the image have a flag in said model to distinguish them from other features, and the storing means comprises means for limiting the raster light point features which can be stored in the translucency stack.

20. An apparatus according to claim 19, wherein the limiting means is arranged to limit the raster light point features in the translucency stack to one.

21. An apparatus according to claim 1, wherein the sampling point output producing means comprises means for producing red, green and blue outputs derived from the following equations:

$$R = cT_0 \cdot R_0 + cT_1 \cdot R_1 + \ldots cT_N \cdot R_N$$

$$G = cT_0 \cdot G_0 + cT_1 \cdot G_1 + \ldots cT_N \cdot G_N$$

$$B = cT_0 \cdot B_0 + cT_1 \cdot B_1 + \ldots cT_N \cdot G_N$$

where R, G and B are the red, green and blue outputs respectively, $cT_N$ is a cumulative translucency of a Nth feature in distance from an eyepoint order stored by the feature storing means, $R_N$ is the red component of the Nth feature in distance from the eyepoint order stored by the storing means, $G_N$ is the green component of the Nth feature in distance from the eyepoint order stored by the storing means, and $B_N$ is the blue component of the Nth feature in distance from the eyepoint order stored by the storing means.

22. An apparatus according to claim 1, wherein the pixel producing output means comprises a weighting and accumulation circuit receiving outputs corresponding to each pixel from the sampling point output producing means for each sampling point affecting that pixel, the weighting and accumulation circuit allocating a weighting to each received output of the sampling point output producing means that is a function of the position of each sampling point relative to that pixel, and accumulating the weighted outputs of the sampling point output producing means for producing said pixel output.

23. An apparatus according to claim 1, wherein the sampling point position determining means comprises means for determining corner coordinates in screen space for each sub-area, and means for determining sampling point coordinates by interpolation from the corner coordinates.

24. An apparatus according to claim 1, wherein each sub-area has a boundary in screen space corresponding to a boundary of the screen space area that represents a mapping from eyepoint space to screen space of an area of the display screen covered by one or more pixels corresponding to the sub-area.

25. An apparatus according to claim 1, wherein each sub-area covers at least one pixel and a boundary area extending a predetermined distance therearound.

26. An apparatus according to claim 25, wherein the boundary area is equal in width to one half a pixel width.

27. An apparatus according to claim 1, wherein the sub-area coverage determining means comprises means for detecting opaque features which fully cover the sub-area, and means for discarding features which lie farther away from the eyepoint than the fully covering opaque feature.

28. An apparatus according to claim 27, comprising means for calculating the distance from the eyepoint at each corner of the sub-area of a plane defined by each feature, and means for comparing the calculated distances, and discarding a feature if the calculated distances for that feature are greater than corresponding calculated distances for a nearest to the eyepoint opaque feature.

29. An apparatus according to claim 28, wherein the discarding means comprises a store receiving data identifying features at least partially covering the respective sub-area, the comparing means receiving outputs from the store and providing an input to the store to cause data identifying features lying behind the nearest opaque feature to be cancelled from the store.

30. An apparatus according to claim 1, wherein the sub-area coverage determining means comprises means for calculating a perpendicular distance from each corner of the sub-area to the edges of a bounding box defined in screen space coordinates for each feature to include all that feature within its extent, and means for logically combining the calculated perpendicular distances to provide an output indicative of sub-area coverage.

31. An apparatus according to claim 30, wherein the bounding box is defined by edges forming a closed string of connected vectors all running in the same direction around the box and the combining means produces an outcode in respect of each sub-area corner, the outcode for any one corner being a first outcode if all the bounding box edge distances are of one sign or zero, a second outcode if all the bounding box edge distances are of the opposite sign or some are of the opposite sign and some are zero, and a third outcode if any other combination of bounding box edge distances is produced, the outcodes for the corners being combined by gates to form total outcodes a first of which indicates that the bounding box totally covers the sub-area, a second of which indicates that the bounding box partially covers the sub-area, and the remainder of which indicate that the bounding box is outside the sub-area.

32. An apparatus according to claim 31, comprising means for combining the total outcodes to produce final outcodes, a first final outcode indicating that the sub-area is at least partially covered if the bounding box and polygon edge outcodes are both either the first or the second total outcode, and a second final outcode indicating that the sub-area is totally covered by an opaque feature if the bounding box and polygon edge final outcodes are both the first total outcode and the feature is opaque.

33. An apparatus according to claim 1, wherein the sub-area coverage determining means comprises means for calculating a perpendicular distance from each corner of the sub-area to edges of polygonal features, and means for logically combining the calculated perpendicular distances to provide an output indicative of sub-area coverage.

34. An apparatus according to claim 33, wherein the polygonal features are defined by edges forming a closed string of connected vectors all running in the same direction around the polygon, and the combining means produces an outcode in respect of each sub-area corner, the outcode for any one corner being a first outcode if all the polygon edge distances are of one sign or zero, a second outcode if all the polygon edge distances are of the opposite sign or some are of the opposite sign and some are zero, and a third outcode if any other combination of polygon edge distances is produced, the outcodes for the corners being combined by gates to form total outcodes a first of which indicates that the polygon totally covers the sub-area, a second of which indicates that the polygon partially covers the sub-area, and the remainder of which indicate is that the polygon outside the sub-area.

35. An apparatus according to claim 1, comprising super sub-area dividing means for dividing the image area into an array of super sub-areas each of which covers a plurality of said sub-areas, means for storing data identifying features which at least partially cover each super sub-area, and means for reading out data to the sub-area coverage determining means from the storing means one super sub-area at a time.

36. An apparatus according to claim 35, wherein the sub-area coverage determining means processes each sub-area of the super sub-area separately.

37. An apparatus according to claim 36, wherein the sub-area coverage determining means comprises at least two processors, and means are provided to distribute processing tasks to the processors such that adjacent sub-areas are processed by different processors.

38. An apparatus according to claim 35, comprising means for calculating a perpendicular distance from a reference point within a super sub-area to each edge of a feature, means for calculating a limiting distance from the reference point, the limiting distance being such that if a feature edge is at a distance from the reference point greater than the limiting distance that edge cannot cross the super sub-area, means for comparing the calculated perpendicular distances with the limiting distance, and means for assessing super sub-area coverage by a feature on the basis of a logical combination of the results of the comparison between the calculated perpendicular distances and the limiting distance.

39. An apparatus according to claim 38, wherein each super sub-area is rectangular, and means are provided to calculate a limiting distance for each edge of a feature with respect to each corner of the super sub-area, the limiting distance being a perpendicular distance from the center of the super sub-area to a line drawn parallel to a respective feature edge and passing through a respective super sub-area corner.

40. An image generator for use with an image projection system in which an image is projected onto a display surface and the display surface is viewed from a predetermined eyepoint through an imaginary viewing plane of predetermined area, the image being projected as a series of raster scan lines each made up from a respective row of display pixels, wherein the image generator comprises a model database in which features of the model are described by geometrical attribute data defining the feature with reference to world space and non-geometrical attribute data defining characteristics of the feature, means for determining an eyepoint position in world space from which the model is to be viewed, means for transforming geometrical attribute data from world space to eyepoint space, and means for calculating image data to be displayed on the display surface from the transformed geometrical attribute data and the non-geometrical attribute data, the image data being consistent with an appearance of the model from the eyepoint, wherein the image data calculating means comprises:

a. means for dividing a viewing plane area into an array of sub-areas, each sub-area being defined by four corner coordinates arranged such that a projection of the sub-area onto the display surface from the eyepoint corresponds in shape and area to a portion of the display surface upon which a predetermined respective group of pixels is projected, b. means for defining a position of at least one sampling point within each sub-area, each sampling point position being defined by reference to corners of the respective sub-area, c. means for determining from the transformed geometrical feature attributes and the position of each sampling point which of the sampling points is covered by each of the features, d. attribute storing means for storing for each sampling point non-geometrical attribute data for at least one feature covering that sampling point, and e. pixel output generating means for generating from the stored attribute data an output to the image projection system in respect of each pixel.

41. An image generator according to claim 40, wherein each sub-area has linear edges.

42. An image generator according to claim 40, wherein each sub-area corresponds in area to a rectangular array of pixels including a plurality of rows and columns of pixels.

43. An image generator according to claim 40, comprising a plurality of sampling points per pixel.

44. An image generator according to claim 40, wherein the attribute storing means comprises means for storing for each sampling point attribute data for one opaque and at least one translucent feature covering that sampling point.

45. An image generator according to claim 40, wherein the pixel output generating means comprises means for accumulating and weighting the stored attribute data from a predetermined group of sampling points distributed near a pixel to produce the output to the image projection system.

46. An apparatus for producing an image on a display screen of a world space model made up from a plurality of features defined in world space, the model including features defined light point and non-light point features and being viewed from an eyepoint defined in world space, wherein the apparatus comprises:

a. means for calculating a finite area in screen space to be occupied by each light point feature, b. intensity calculating means for calculating the intensity of light point features, c. means for calculating a translucency for each light point feature visible from the eyepoint, the calculated translucency being a function of the calculated intensity, and d. output producing means for producing outputs to a display device, said outputs corresponding to said calculated finite area, light intensity and feature translucency.

47. An apparatus according to claim 46, wherein the intensity calculating means calculates intensity of light point features as a function of at least the distance from the eyepoint to the light point.

48. An apparatus according to claim 46, comprising means for determining translucency of non-light point features, means for defining the screen space position of a plurality of sampling points distributed across the display screen, means for determining area of screen space which would be occupied by each feature if that feature alone was viewed from the eyepoint, means for determining for each sampling point which features occupy a position in screen space corresponding to that sampling point, and means for storing attributes for each sampling point including translucency for a nearest to the eyepoint opaque feature and any nearer to the eyepoint translucent features which occupy the position in screen space of that sampling point, the output producing means producing outputs to the display device appropriate to the stored attributes at each sampling point.

49. An apparatus according to claim 48, wherein the storing means comprises a translucency stack, and data describing light points which are to be displayed in a raster made up from a plurality of pixels are stored with data describing non-light point features in the translucency stack in order of their distance from the eyepoint, the output producing means producing an output for each sampling point in accordance with the following equations:

$$R = cT_0 \cdot R_0 + cT_1 \cdot R_1 + \ldots cT_N \cdot R_N$$

$$G = cT_0 \cdot G_0 + cT_1 \cdot G_1 + \ldots cT_N \cdot G_N$$

$$B = cT_0 \cdot B_0 + cT_1 \cdot B_1 + \ldots cT_N \cdot B_N$$

where R, G and B are red, green and blue outputs respectively, $cT_N$ is the cumulative translucency of the Nth feature in distance from the eyepoint order stored by the storing means, $R_N$ is the red component of the Nth feature in distance from the eyepoint order stored by the storing means, $G_N$ is the green component of the Nth feature in distance from the eyepoint order stored by the storing means, and $B_N$ is the blue component of the Nth feature in distance from the eyepoint order stored by the storing means.

50. An apparatus according to claim 49, comprising means for limiting the light points to be displayed in the raster which can be stored in the translucency stack.

51. An apparatus according to claim 50, comprising means for limiting the light points in the translucency stack to one.

52. An apparatus for producing an image on a display screen of a world space model made up from a plurality of features defined by world space coordinates and viewed from an eyepoint defined in world space, the model including light point features each defined by world space coordinates determining a position of the light point in world space, wherein the apparatus comprises:

a. means for calculating screen space coordinates of each light point, b. means for calculating a screen space area for each light point as a function of at least distance in world space between the light point and eyepoint, c. intensity calculating means for calculating an intensity for each light point, d. means for defining the screen space positions of a plurality of sampling points distributed across the display screen using the calculated light point screen space coordinates, e. means for determining for each light point which of the sampling points lie within the calculated area of the light point, and f. means for producing an output to a display device for each light point, said output corresponding to the calculated light point intensity and the particular sampling points which lie within the calculated area of the light point.

53. An apparatus according to claim 52, wherein the intensity calculating means calculates intensity as a function of distance between the eyepoint and light point.

54. An apparatus according to claim 52, wherein at least one of the light point features is to be displayed calligraphically, the apparatus further comprising means at each sampling point for calculating the attenuation of, a calligraphic light point within the area of which that sampling point is located, the attenuation accounting for the presence of any other feature which covers the sampling point and is nearer to the eyepoint than the calligraphic light point, and means for calculating a display intensity for the calligraphic light point as a function of the sum of the attenuations of the calligraphic light point at all the sampling points which are positioned within the area of the calligraphic light point and the light point intrinsic intensity.

55. An apparatus according to claim 54, wherein the intensity calculating means calculates an intrinsic intensity for each light point assuming no occultation of the light point by nearer to the eyepoint features, the apparatus further comprising means for calculating a translucency for each calligraphic light point, the translucency being calculated as a function of the calculated intrinsic intensity, and means for calculating a display intensity for calligraphic light points as a function of the intrinsic intensity attenuated by any nearer to the eyepoint opaque or translucent features.

56. An apparatus according to claim 55, comprising calligraphic light point processing means for processing calligraphic light point features in near to liar from the eyepoint order after all non-calligraphic light points have been processed, the calligraphic light point processing memos comprising attenuation calculating means for calculating for each sampling point the attenuation of calligraphic light points coveting that sampling point as a function of translucency of features that are nearer to the eyepoint than the calligraphic light point, means for accumulating for each calligraphic light point the calculated attenuations for all sampling points covered by that light point, and means for producing for each calligraphic light point a calligraphic light point display intensity output which is a function of the accumulated attenuations, the light point display intensity being stored in a calligraphic light point projection device.

57. An apparatus according to claim 56, comprising means for determining an aperture for a calligraphic light point, the aperture being a sum of sampling points potentially covered by the calligraphic light point, means for determining an attenuation factor for a calligraphic light point, the attenuation factor being a sum of the attenuations of the calligraphic light point at each covered sampling point, and the attenuation at each sampling point being a calculation of the proportion of light emitted by the feature represented as the calligraphic light point which in the modelled world would reach the eyepoint, and means for calculating the display intensity for the calligraphic light point by multiplying the intrinsic intensity of the light point by a fraction calculated as the attenuation factor divided by the aperture.

58. An apparatus according to claim 56, wherein the attenuation calculating means comprises a translucency stack for each sampling point, means for storing in the translucency stack data identifying the nearest opaque and any nearer to the eyepoint non-calligraphic light point features which cover that sampling point, a veil store corresponding to each sampling point, means for comparing the distance from the eyepoint of each calligraphic light point with the distances from the eyepoint of features stored in the translucency stack, and means for storing in the veil store a cumulative translucency for the calligraphic light point, the cumulative translucency being representative of the attenuation of the calligraphic light point by nearer to the eyepoint features stored in the translucency stack.

59. An apparatus according to claim 58, wherein the calculated attenuation and aperture for each potentially impacted sampling point are combined with those of other impacted sampling points and output to the light point store.

60. An apparatus for scan converting data describing a plurality of features to enable the display of an image of a world space model defined by those features, each feature having a boundary defined by a plurality of straight edges, and each edge being defined by a line equation in screen space coordinates, the apparatus comprising means for dividing the screen into a plurality of sub-areas, and means for analyzing the coverage of any one sub-area by any one feature, wherein the coverage analyzing means comprises:
 a. means for calculating a perpendicular distance from a reference point within the one sub-area to each edge of the one feature,
 b. means for calculating a limiting distance from the reference point, the limiting distance being such that if a feature edge is at a perpendicular distance from the reference point which is greater than the limiting distance that edge cannot cross the sub-area,
 c. means for comparing the calculated perpendicular distances with the limiting distance, and
 d. means for assessing coverage of the sub-area by a feature on the basis of a logical combination of results of the comparisons between the calculated distances and the limiting distance.

61. An apparatus according to claim 60, wherein each sub-area is rectangular and means are provided to calculate a limiting distance for each edge of a feature with respect to each corner of the sub-area, the limiting distance being the perpendicular distance from a center of the sub-area to a line drawn parallel to a respective feature edge and passing through a respective sub-area corner.

62. An apparatus for processing data describing a model an image of which is to be displayed on a screen, the model comprising a plurality of features each described in terms of geometrical attributes defining position and orientation of the feature and non-geometrical attributes defining characteristics of the feature, and the image being intended to represent a view of the model from an eyepoint in world space, comprising
 a. a database in which model data is stored in a hierarchical tree structure having a root node corresponding to a base of the tree, branch nodes corresponding to branching points of the tree, and leaf nodes corresponding to ends of individual branches of the tree, each node of the tree storing data describing a respective object, leaf nodes storing at least one feature of the respective object, and root and branch nodes storing at least one pointer to another object and transformation data defining a relative position and orientation of the pointed to object relative to a pointed from object, whereby successive locations in the tree structure store data related to successively more detailed portions of the model,
 b. a transformation processor having a parallel array of object processors, and
 c. a controller for reading out data from the database to the object processors such that data read out from one node is read out to a corresponding one of a plurality of data processors,
wherein each data processor is adapted to receive data read out from any node of the tree, one of said object processors responding to read out of pointer data by transforming the respective transformation data into a common coordinate space and returning the pointer and the transformed data to the controller, and the one object processor responding to read out of a feature by transforming the geometrical attributes of the feature, the controller reading out data stored at the node corresponding to the base of the tree and subsequently to read out data stored at nodes of the tree identified by the pointers returned to it from the object processors.

63. An apparatus according to claim 62, wherein the controller reads out object data to a bus to which each of said object processors are linked, means are provided to indicate whether an object processor is idle and available to receive object data for processing, and means are provided for enabling an idle object processor to receive object data made available on the bus, the object processor receiving the object data indicating that the object data has been received for processing to prevent the same object data being received by other object processors.

64. An apparatus according to claim 63, wherein the object processors are arranged in groups, each group communicating with the bus through a local controller, the local controller accepting object data from the bus only if at least one of the respective group of object processors is idle, and the local controller indicating by a signal applied to the bus when it has accepted object data for processing by one of its respective group of object processors.

65. An apparatus according to claim 63, wherein object data is distributed to object processors on a pseudo-random basis.

66. An apparatus according to claim 63, wherein each object processor comprises means for indicating completion of processing of object data read out to that object processor.

67. An apparatus according to claim 62, wherein each of the object processors responds to receipt of pointer and feature data describing an object firstly by processing the pointer data and returning the pointers to the controller and secondly by processing the feature data.

* * * * *

UNITED STATES PATENT AND TRADEMARK OFFICE
CERTIFICATE OF CORRECTION

PATENT NO. : 5,363,475
DATED : November 8, 1994
INVENTOR(S) : Steven J. Baker; Dennis A. Cowdrey; Graham J. Olive, Karl J. Wood

It is certified that error appears in the above-indentified patent and that said Letters Patent is hereby corrected as shown below:

Claim 1, column 42, line 68, change "angry" to --array--.
Claim 46, column 48, line 58, after "defined", insert --as--.
Claim 56, column 50, line 53, change "liar" to --far--; and
Claim 56, column 50, line 56, change "memos" to --means--.

Signed and Sealed this

Twenty-eighth Day of October, 1997

Attest:

BRUCE LEHMAN

Attesting Officer     Commissioner of Patents and Trademarks